United States Patent
Kaltenbach et al.

(10) Patent No.: US 11,364,784 B2
(45) Date of Patent: Jun. 21, 2022

(54) TRANSMISSION FOR A MOTOR VEHICLE, MOTOR VEHICLE POWERTRAIN COMPRISING SAID TRANSMISSION, AND METHOD FOR OPERATING THE TRANSMISSION

(71) Applicant: ZF Friedrichshafen AG, Friedrichshafen (DE)

(72) Inventors: Johannes Kaltenbach, Friedrichshafen (DE); Uwe Griesmeier, Markdorf (DE); Stefan Beck, Eriskirch (DE); Matthias Horn, Tettnang (DE); Viktor Warth, Friedrichshafen (DE); Michael Roske, Friedrichshafen (DE); Fabian Kutter, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 3 days.

(21) Appl. No.: 16/756,651

(22) PCT Filed: Sep. 6, 2018

(86) PCT No.: PCT/EP2018/073942
§ 371 (c)(1),
(2) Date: Apr. 16, 2020

(87) PCT Pub. No.: WO2019/076529
PCT Pub. Date: Apr. 25, 2019

(65) Prior Publication Data
US 2020/0331336 A1 Oct. 22, 2020

(30) Foreign Application Priority Data
Oct. 17, 2017 (DE) ...................... 10 2017 218 513.9

(51) Int. Cl.
*B60K 6/36* (2007.10)
*B60K 6/38* (2007.10)
(Continued)

(52) U.S. Cl.
CPC .................. *B60K 6/36* (2013.01); *B60K 6/38* (2013.01); *F16H 3/724* (2013.01); *F16H 37/065* (2013.01);
(Continued)

(58) Field of Classification Search
CPC . B60K 6/38; B60K 6/36; B60K 6/365; B60K 6/547; B60K 6/442; B60K 6/48;
(Continued)

(56) References Cited

U.S. PATENT DOCUMENTS

| | | |
|---|---|---|
| 8,585,520 B2 | 11/2013 | Turnbull et al. |
| 8,911,315 B2 | 12/2014 | Kaltenbach et al. |

(Continued)

FOREIGN PATENT DOCUMENTS

| | | |
|---|---|---|
| CN | 206031051 U | 3/2017 |
| DE | 102009019046 A1 | 11/2010 |

(Continued)

OTHER PUBLICATIONS

International Search Report (English Translation) PCT/EP2018/073942, dated Dec. 4, 2018. (2 pages).
(Continued)

*Primary Examiner* — Huan Le
(74) *Attorney, Agent, or Firm* — Dority & Manning, P.A.

(57) ABSTRACT

A transmission (G) for a motor vehicle includes an electric machine (EM1), a first input shaft (GW1), a second input shaft (GW2), an output shaft (GWA), at least two planetary gear sets (P1, P2), and at least four shift elements (A, B, C, D). Different gears are selectable by selectively actuating the at least four shift elements (A, B, C, D). In interaction with
(Continued)

the electric machine (EM1), different operating modes are implementable. A drive train for a motor vehicle that includes such a transmission (G) and to a method for operating same are also provided.

17 Claims, 15 Drawing Sheets

(51) Int. Cl.
*F16H 3/72* (2006.01)
*F16H 37/06* (2006.01)

(52) U.S. Cl.
CPC ...... *F16H 3/725* (2013.01); *F16H 2200/2007* (2013.01); *F16H 2200/2064* (2013.01); *F16H 2200/2094* (2013.01)

(58) Field of Classification Search
CPC ..... B60K 2006/4816; F16H 3/66; F16H 3/78; F16H 3/72; F16H 3/725; F16H 3/724; F16H 37/06; F16H 37/065; F16H 2003/445; F16H 2003/447; F16H 2200/2007; F16H 2200/2064; F16H 2200/2094
See application file for complete search history.

(56) References Cited

U.S. PATENT DOCUMENTS

| | | | |
|---|---|---|---|
| 9,631,709 B2 | 4/2017 | Scholle et al. | |
| 10,023,181 B2* | 7/2018 | Atarashi | B60W 10/115 |
| 2009/0186735 A1 | 7/2009 | Iwanaka et al. | |
| 2013/0345010 A1* | 12/2013 | Kaltenbach | F16H 37/065 475/5 |

FOREIGN PATENT DOCUMENTS

| | | | | |
|---|---|---|---|---|
| DE | 102011117863 A1 | | 5/2012 | |
| DE | 102011005531 A1 | | 9/2012 | |
| DE | 102013002587 A1 | | 8/2014 | |
| DE | 102013013947 A1 | | 2/2015 | |
| DE | 102014204009 A1 | | 9/2015 | |
| DE | 102015209294 A1 | | 11/2016 | |
| DE | 102015226269 | * | 6/2017 | ............ B60K 6/365 |
| DE | 102015226269 A1 | | 6/2017 | |
| WO | WO 2015/131897 | | 9/2015 | |

OTHER PUBLICATIONS

German Search Report DE102017218513.9, dated Sep. 24, 2018. (14 pages).

* cited by examiner

| Gear | A | B | C | D | i | phi |
|---|---|---|---|---|---|---|
| 1 |  | X | X |  | 1.40 | 1.40 |
| 2a | X |  | X |  | 1.00 | 1.00 |
| 2b | X |  |  | X | 1.00 | 1.40 |
| 3 |  | X |  | X | 0.71 |  |
| E1 |  |  | X |  | 1.40 | 1.96 |
| E3 |  |  |  | X | 0.71 |  |

Fig. 3

| Condition | Gear EM1 | Gear EM2 | A | B | C | D |
|---|---|---|---|---|---|---|
| I | E1 | 0 |  |  | X |  |
| II | E3 | 0 |  |  |  | X |
| III | 0 | 2 | X |  |  |  |
| IV | E1 | 1 |  | X | X |  |
| V | E1 | 2 | X |  | X |  |
| VI | E3 | 2 | X |  |  | X |
| VII | E3 | 3 |  | X |  | X |

Fig. 5

| Condition | Gear EM1 | Gear EM2 | Gear VKM | K0 | A | B | C | D |
|---|---|---|---|---|---|---|---|---|
| I | E1 | 0 | 0 | | | | x | |
| II | E3 | 0 | 0 | | | | | x |
| III | 0 | 2 | 0 | | x | | | |
| IV | E1 | 1 | 0 | | | | x | x |
| V | E1 | 2 | 0 | | x | | x | |
| VI | E3 | 2 | 0 | | x | | | x |
| VII | E3 | 3 | 0 | | | | x | x |
| VIII | 0 | 0 | 0 | x | | | | |
| IX | 0 | 0 | 0 | x | | x | | |
| X | E1 | 0 | 0 | x | | | x | |
| XI | E3 | 0 | 0 | x | | | | x |
| XII | 0 | 2 | 2 | x | x | | | |
| XIII | E1 | 1 | 1 | x | | x | x | |
| XIV | E1 | 2 | 2 | x | x | | x | |
| XV | E3 | 2 | 2 | x | x | | | x |
| XVI | E3 | 3 | 3 | x | | x | | x |

Fig. 7

TRANSMISSION FOR A MOTOR VEHICLE, MOTOR VEHICLE POWERTRAIN COMPRISING SAID TRANSMISSION, AND METHOD FOR OPERATING THE TRANSMISSION

CROSS-REFERENCE TO RELATED APPLICATION

The present application is related and has right of priority to German Patent Application No. 10 2017 218 513.9 filed on Oct. 17, 2017 and to PCT International Publication No. WO 2019/076529, both of which are incorporated by reference in their entirety for all purposes.

FIELD OF THE INVENTION

The invention relates generally to a transmission for a motor vehicle, including an electric machine, a first input shaft, a second input shaft, an output shaft, and a first planetary gear set and a second planetary gear set. The planetary gear sets each include multiple elements. A first shift element, a second shift element, a third shift element, and a fourth shift element are provided, and a rotor of the electric machine is connected to the second input shaft.

BACKGROUND

In the case of hybrid vehicles, transmissions are known which include not only a gear set, but also one or multiple electric machines. In this case, the transmission is usually configured to be multi-stage, i.e., multiple different transmission ratios can be selected, as gears, between an input shaft and an output shaft by actuating appropriate shift elements, wherein the shifting between the multiple different transmission ratios is preferably automatically carried out. Depending on the arrangement of the shift elements, the shift elements are clutches or even brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be incorporated in the transmission in order to implement various operating modes in different ways.

DE 10 2011 005 531 A1 describes a motor vehicle drive train of a hybrid vehicle, wherein, in the motor vehicle drive train, a prime mover in the form of an internal combustion engine is connected via a transmission to an axle transmission of a drive axle of the motor vehicle. The transmission includes two input shafts and one output shaft and includes two planetary gear sets as well as an electric machine. Moreover, four shift elements are provided, with the aid of which different power paths can be achieved from one input shaft or even both input shafts to the output shaft while implementing different gears.

SUMMARY OF THE INVENTION

Example aspects of the present invention provide an alternative embodiment to the transmission for a motor vehicle known from the prior art, with the aid of which different operating modes can be implemented in a suitable way, and which has a compact design.

According to example aspects of the invention, a transmission includes an electric machine, a first input shaft, a second input shaft, an output shaft, as well as a first planetary gear set and a second planetary gear set. The planetary gear sets include multiple elements in this case, wherein a first shift element, a second shift element, a third shift element, and a fourth shift element are provided, via the selective actuation of which different power paths are implementable while shifting different gears. Moreover, a rotor of the electric machine is connected to the second input shaft.

Within the meaning of the invention, a "shaft" is understood to be a rotatable component of the transmission, via which associated components of the transmission are rotationally fixed to each other or via which a connection of this type is established upon actuation of an appropriate shift element. The shaft is connectable the components to each other axially or radially or even both axially and radially in this case. The respective shaft can therefore also be present as an intermediate piece, via which a respective component is connected, for example, radially.

Within the meaning of the invention, the term "axially" means an orientation in the direction of an axis along which the planetary gear sets are arranged coaxially to each other. "Radially" is then understood to mean an orientation in the direction of the diameter of a shaft that lies on this axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft can be situated axially in the area of an end of the transmission, at which a mounting interface of the first input shaft is also provided, the mounting interface establishing the connection to the prime mover connected upstream therefrom. This type of arrangement is particularly suitable for the application in a motor vehicle including a drive train aligned transversely to the direction of travel of the motor vehicle.

Alternatively, an output shaft of the transmission can also be provided, however, at an axial end of the transmission situated opposite to a mounting interface of the first input shaft. In this case, a mounting interface of the output shaft is designed at an axial end of the output shaft coaxially to a mounting interface of the first input shaft, so that the input and the output of the transmission are located at opposite axial ends of the transmission. A transmission configured in this way is suitable for use in a motor vehicle including a drive train aligned in the direction of travel of the motor vehicle.

The planetary gear sets are preferably arranged in the sequence first planetary gear set and second planetary gear set axially following the mounting interface of the first input shaft. This sequence can also be reversed within the meaning of the invention, however, so that the second planetary gear set initially axially follows the mounting interface of the first input shaft.

Example aspects of the invention now encompass the technical teaching that the first input shaft is rotationally fixable to the output shaft via the first shift element, while the second input shaft is rotationally fixable to the first input shaft with the aid of the second shift element. Moreover, with respect to the first planetary gear set, there is a first coupling of the first element of the first planetary gear set with a rotationally fixed component, a second coupling of the second element of the first planetary gear set with the output shaft, and a third coupling of the third element of the first planetary gear set with the second input shaft, wherein, of these couplings, two couplings are present as permanent rotationally fixed connections, while, with respect to the remaining coupling, a rotationally fixed connection is establishable with the aid of the third shift element. Likewise, with respect to the second planetary gear set, there is a first coupling of the first element of the second planetary gear set with the rotationally fixed component, a second coupling of the second element of the second planetary gear set with the second input shaft, and a third coupling of the third element of the second planetary gear set with the output shaft. In the case of these couplings as well, two couplings are present as rotationally fixed connections, while, with respect to the remaining coupling, a rotationally fixed connection is establishable with the aid of the fourth shift element.

In other words, during an actuation of the first shift element, the first input shaft is rotationally fixed to the output shaft, while an engagement of the second shift element results in a rotationally fixed connection of the second input shaft to the first input shaft.

In the case of the first planetary gear set, with respect to the transmission according to example aspects of the invention, there are three couplings of the elements of the first planetary gear set. A first coupling is present in the form of the first element of the first planetary gear set with a rotationally fixed component, while, in the case of the second element of the first planetary gear set, there is a second coupling with the output shaft. A third coupling is then present in the form of the third element of the first planetary gear set with the second input shaft. Two of the three aforementioned couplings are implemented as permanently rotationally fixed connections, while the particular remaining coupling is present as a connection, which is established in a rotationally fixed manner only by engaging the third shift element.

Likewise, in the case of the second planetary gear set as well, three couplings of the elements of the second planetary gear set are present, in that a first coupling is present in the form of the first element of the second planetary gear set with the rotationally fixed component, whereas a second coupling is present in the form of the second element of the second planetary gear set with the second input shaft. A third coupling is then present, with respect to the second planetary gear set, between the third element of the second planetary gear set and the output shaft. In this case as well, two of the three aforementioned couplings are designed as permanently rotationally fixed connections, while the particular remaining coupling is established as a rotationally fixed connection only by actuating the fourth shift element.

A "coupling" is understood, within the meaning of the invention, to be a connection that exists either as a permanently rotationally fixed connection or that is established in a rotationally fixed manner only by actuating a particular shift element.

The first shift element and the second shift element are therefore present as clutches, which, upon actuation, possibly synchronize the components of the transmission to be rotationally fixed to each other with respect to their turning motions and, thereafter, connect them to each other in a rotationally fixed manner. The third shift element and the fourth shift element are present, however, either likewise as a clutch or as a brake, depending on the coupling in which the shift element is applied; the brake fixes the particular associated component and, consequently, prevents the particular associated component from turning.

A respective rotationally fixed connection of the rotatable components of the transmission is preferably implemented, according to example embodiments of the invention, via one or even multiple intermediate shafts, which can also be present, in this case, as short intermediate pieces when the components are positioned in a spatially dense manner. Specifically, the components which are permanently rotationally fixed to each other can each be present either as individual components which are rotationally fixed to each other, or even as single pieces. In the second case mentioned above, the respective components and the optionally present shaft are then formed by one common component, wherein this is implemented, in particular, for the case in which the respective components are situated spatially close to each other in the transmission.

In the case of components of the transmission, which are connected to each other only upon actuation of a respective shift element, a connection is also preferably implemented via one or even multiple intermediate shafts.

A fixation takes place by way of a rotationally fixed connection to a rotationally fixed component of the transmission, which is preferably a permanently non-rotating component, preferably a housing of the transmission, a portion of such a housing, or a component rotationally fixed thereto. In the present case, the first element of the first planetary gear set and the first element of the second planetary gear set are each either permanently fixed or are stopped via actuation of the appropriate shift element. If the first element of the first planetary gear set as well as the first element of the second planetary gear set are permanently fixed, it is conceivable in example aspects of the invention that the first element of the first planetary gear set and the first element of the second planetary gear set are connected to each other in a rotationally fixed manner and are jointly fixed. Alternatively, the two elements of the planetary gear sets can also be fixed independent of each other, however.

Within the meaning of the invention, the "connection" of the rotor of the electric machine to the second input shaft of the transmission is to be understood as a connection between these of such a type that a constant rotational-speed dependence prevails between the rotor of the electric machine and the second input shaft. In this case, the electric machine can be arranged either coaxially to the planetary gear sets or so as to lie axially offset with respect thereto. In the former case, the rotor of the electric machine can either be rotationally fixed directly to the second input shaft or can be coupled thereto via one or even multiple intermediate transmission ratio step(s), wherein the latter allows for a more favorable configuration of the electric machine with higher rotational speeds and lower torques. The at least one transmission ratio step can be designed as a spur gear stage and/or as a planet stage in this case. In the case of a coaxial arrangement of the electric machine, the two planetary gear sets are then also further preferably arranged axially in the area of the electric machine as well as radially within the electric machine, so that the axial installation length of the transmission can be shortened.

If the electric machine is provided axially offset with respect to the planetary gear sets, however, a coupling takes place via one or multiple intermediate transmission ratio step(s) and/or a flexible traction drive mechanism. The one or multiple transmission ratio step(s) can also be implemented individually, in this case, as a spur gear stage or as a planetary gear stage. A flexible traction drive mechanism can be either a belt drive or a chain drive.

Overall, a transmission according to example aspects of the invention is distinguished by a compact design, low component loads, good gearing efficiency, and low losses.

According to one example embodiment of the invention, the first element of the first planetary gear set and the first element of the second planetary gear are each fixed, while the third element of the first planetary gear set and the second element of the second planetary gear are each connected to the second input shaft in a rotationally fixed manner. Moreover, the output shaft is connectable, in a rotationally fixed manner, to the second element of the first planetary gear set via the third shift element and can be brought into a rotationally fixed connection with the third element of the second planetary gear set with the aid of the fourth shift element. In this case, therefore, with respect to the first planetary gear set, the second coupling is established as a rotationally fixed connection only upon engagement of the third shift element, whereas this is the third coupling in the case of the second planetary gear set. The third shift element and the fourth shift element are therefore each present as clutches.

Preferably, the first shift element, the second shift element, the third shift element, and the fourth shift element are provided axially on a side of the first planetary gear set facing away from the second planetary gear set, wherein, in this case, the third shift element is situated adjacent to the first planetary gear set and then, axially initially, the fourth shift element, then the first shift element and, finally, the second shift element follow.

Alternatively, it is also conceivable with respect to the aforementioned example embodiment, however, to provide at least individual shift elements of the four shift elements axially between the first planetary gear set and the second planetary gear set. In a first variant, the four shift elements are all provided axially between the two planetary gear sets, wherein, in particular, the third shift element is provided axially adjacent to the first planetary gear set and then, axially initially, the fourth shift element, then the first shift element and, finally, the second shift element follow. A pressure medium supply of the first shift element and the second shift element takes place, in particular, via the first input shaft, while the third shift element and the fourth shift element are preferably supplied with pressure medium via the output shaft.

In an alternative example variant, however, only the third shift element and the fourth shift element are located axially between the first planetary gear set and the second planetary gear set, wherein the third shift element is situated axially between the first planetary gear set and the fourth shift element. The first shift element and the second shift element are then provided axially on a side of the first planetary gear set facing away from the second planetary gear set, wherein the first shift element is provided axially between the second shift element and the first planetary gear set. A pressure medium supply of the third shift element and the fourth shift element takes place preferably via the output shaft.

According to one alternative example design option of the invention, the third element of the first planetary gear set and the second element of the second planetary gear set are each rotationally fixed to the second input shaft, while the second element of the first planetary gear set and the third element of the second planetary gear set are each rotationally fixed to the output shaft. In addition, the first element of the first planetary gear set is fixable via the third shift element and the first element of the second planetary gear set is fixable with the aid of the fourth shift element. In the case of this example design option, therefore, with respect to the first planetary gear set and also with respect to the second planetary gear set, the first coupling in each case is configured in such a way that a rotationally fixed connection is formed only upon actuation of the third and the fourth shift element, respectively. The third shift element and the fourth shift element are therefore each designed as brakes in this case.

Preferably, the four shift elements are provided axially on a side of the first planetary gear set facing away from the second planetary gear set, wherein it is further preferred when the fourth shift element is situated axially adjacent to the first planetary gear set and then, axially initially, the third shift element, then the first shift element and, finally, the second shift element follow.

Alternatively, it is also conceivable, however, that the first shift element and the second shift element are located axially on a side of the first planetary gear set facing away from the second planetary gear set, while the third shift element and the fourth shift element are provided axially on a side of the second planetary gear set facing away from the first planetary gear set.

Further alternatively, the first shift element and the second shift element are provided axially between the planetary gear sets, wherein the first shift element is arranged axially between the first planetary gear set and the second shift element. Moreover, the third shift element is preferably provided axially on a side of the first planetary gear set facing away from the second planetary gear set, whereas the fourth shift element is situated axially, in particular, on a side of the second planetary gear set facing away from the first planetary gear set. A pressure medium supply of the first shift element and the second shift element can take place, in particular, via the first input shaft.

Further alternatively, however, the first shift element and the third shift element can also be provided axially on a side of the first planetary gear set facing away from the second planetary gear set, while the second shift element and the fourth shift element are located axially on a side of the second planetary gear set facing away from the first planetary gear set. Finally, in one further example alternative, the first shift element, the second shift element, and the fourth shift element can also be arranged axially on a side of the second planetary gear set facing away from the first planetary gear set, while the third shift element is situated axially on a side of the first planetary gear set facing away from the second planetary gear set.

According to one further example embodiment of the invention, the first element of the first planetary gear set and the first element of the second planetary gear set are each fixed, while the second element of the first planetary gear set and the third element of the second planetary gear are each connected to the output shaft in a rotationally fixed manner. Moreover, the second input shaft is connectable, in a rotationally fixed manner, to the third element of the first planetary gear set via the third shift element and is shiftable into a rotationally fixed connection with the second element of the second planetary gear set with the aid of the fourth shift element. In this case, therefore, with respect to the first planetary gear set, the third coupling is established in a rotationally fixed manner only upon engagement of the third shift element and, in the case of the second planetary gear set, the second coupling is established in a rotationally fixed manner only by actuating the fourth shift element, wherein the third shift element and the fourth shift element are each present as a clutch.

In particular, the first shift element and the second shift element are provided axially on a side of the first planetary gear set facing away from the second planetary gear set, while the third shift element and the fourth shift element are situated axially between the first planetary gear set and the second planetary gear set. The fourth shift element can be supplied with pressure medium via the second input shaft. The first shift element is provided axially between the second shift element and the first planetary gear set, whereas the third shift element is situated axially between the first planetary gear set and the fourth shift element.

According to an alternative example variant of the invention, the four shift elements are provided axially on a side of the second planetary gear set facing away from the first planetary gear set, wherein the fourth shift element is situated axially, in particular, adjacent to the second planetary gear set and then, axially initially, the third shift element, then the first shift element and, finally, the second shift element follow.

It is particularly preferred when precisely three gears result between the first input shaft and the output shaft in all aforementioned example variants. It is further preferred when these three gears are implementable via selective engagement of the shift elements. A first gear results between the first input shaft and the output shaft by actuating the second shift element and the third shift element, whereas a second gear is engageable between the first input shaft and the output shaft, in a first example variant, by engaging the first shift element and the third shift element. In addition, the second gear, which is effective between the first input shaft and the output shaft, is implementable, in a second example variant, by actuating the first shift element and the fourth shift element. The second gear, which is effective between the first input shaft and the output shaft, also results, however, already by engaging the first shift element, since the first input shaft and the output shaft are then already connected to each other in a rotationally fixed manner. Switching between the two example variants of the second gear is only necessary in order to prepare for a gear shift into the third gear or also into the first gear. Finally, a third gear results between the first input shaft and the output shaft by engaging the second shift element and the fourth shift element.

With the aid of a suitable selection of stationary transmission ratios of the planetary gear sets, a transmission ratio range which is suitable for the application in the case of a motor vehicle is implemented as a result. In this case, gear shifts between the gears are implementable, in which only the condition of two shift elements is to be varied in each case, in that one of the shift elements contributing to the previous gear is to be disengaged and another shift element for implementing the subsequent gear is to be engaged. As a further consequence thereof, a shift between the gears can take place very rapidly. Since the second gear is designed as a direct gear in this case, it could also be shifted, however, merely by engaging the first shift element, as explained above.

Due to the basic configuration of the transmission according to example aspects of the invention, ratio steps between the first gear and the second gear, as well as between the second gear and the third gear can be well designed, since a stationary transmission ratio of the first planetary gear set only influences the ratio step between the first gear and the second gear, and a stationary transmission ratio of the second planetary gear set only influences the ratio step between the second gear and the third gear. In addition, in the case of preferred stationary transmission ratios of the planetary gear sets of negative two and a half (−2.5), suitable ratios in the three gears as well as small ratio steps between the gears result, with an overall gear ratio of, for example, two (2.0) in this case. Moreover, in the three gears, only low speed factors and differential speed factors occur at the individual components of the transmission.

Due to the connection of the electric machine to the second input shaft of the transmission, different operating modes can be achieved in a simple way.

A first gear between the second input shaft and the output shaft can be utilized for purely electric driving, wherein this first gear results by engaging the third shift element. As a result, the rotor of the electric machine is connected to the output shaft via the first planetary gear set, wherein a ratio of this first gear corresponds to a ratio of the first gear effective between the first input shaft and the output shaft.

In addition, a second gear is also implementable between the second input shaft and the output shaft for purely electric driving. The fourth shift element is to be actuated in order to implement this second gear, so that the rotor of the electric machine is then connected to the output shaft via the second planetary gear set. A ratio of this second gear, which is effective between the second input shaft and the output shaft, corresponds to a ratio of the third gear, which is effective between the first input shaft and the output shaft.

Starting from purely electric driving in the first gear, which is effective between the second input shaft and the output shaft, the upstream prime mover can then be started in the first gear or in the second gear, which is effective between the first input shaft and the output shaft, since the third shift element contributes to each thereof. A start of the upstream prime mover can also take place from the second gear, which is effective between the second input shaft and the output shaft, via additional engagement of the first shift element or of the second shift element, wherein, as a result, the second gear or the third gear, which is effective between the first input shaft and the output shaft, respectively, is then implemented.

As yet another operating mode, a charging operation of an electric accumulator is also implementable, in that only the second shift element is engaged and, therefore, a connection of the first input shaft to the electric machine is established and, therefore, a connection of the upstream prime mover to the electric machine is also established. At the same time, a force-fit connection to the output shaft is not established, and therefore the transmission is in a neutral position. Apart from a charging operation, a start of the upstream prime mover via the electric machine is also implementable as a result.

Moreover, powershifts with tractive force support are implementable: during the gearchange between the first gear, which is effective between the first input shaft and the output shaft, and the first example variant of the second gear, which is effective between the first input shaft and the output shaft, the tractive force with the third shift element engaged is supportable via the electric machine, wherein the synchronization of the first shift element to be engaged takes place via a closed-loop control of the rotational speed of the upstream prime mover. A gearchange between the example variant of the second gear, which is effective between the first input shaft and the output shaft, can also take place with the first shift element engaged, wherein, in this case, however, the upstream prime mover supports the tractive force, and a synchronization of the fourth shift element, which is to be engaged, is implemented with the aid of a closed-loop control of the rotational speed of the electric machine. Finally, as part of a gearchange between the second example variant of the second gear, which is effective between the first input shaft and the output shaft, and the third gear, which is effective between the first input shaft and the output shaft, the tractive force with the fourth shift element engaged is supported via the electric machine, while a synchronization of the second shift element, which is to be engaged, takes place with the aid of a closed-loop control of the rotational speed of the upstream prime mover.

As one further example design option of the invention, a further electric machine is provided, the rotor of which is connected to the first input shaft. Such an example embodiment has the advantage that further driving modes can be achieved as a result. In addition, as a result, a start of the upstream prime mover is implementable immediately, if necessary, if the prime mover is designed as an internal combustion engine. In addition, the additional electric machine can support the upstream prime mover in the synchronization of shift elements. The further electric machine can also be arranged coaxially or axially offset, wherein the intermediate connection of one or even multiple gear stages is conceivable in this case as well.

According to one further example embodiment of the invention, the first input shaft is connectable in a rotationally fixed manner, via a fifth shift element, to a connection shaft, which, in turn, is coupled to the prime mover connected upstream from the transmission. The fifth shift element can be designed, in principle, as a force-locking or even as a form-locking shift element in this case, although it is particularly preferred when the fifth shift element is a dog clutch. Via the fifth shift element, the upstream prime mover is also completely decouplable from the transmission, so that a purely electric operation is implementable in a problem-free manner.

In one example refinement of the invention, one or multiple shift elements are each implemented as a form-locking shift element. In this case, the respective shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved.

According to one further example embodiment of the invention, the first shift element and the second shift element are combined to form one shift element pair, with which one actuating element is associated. The first shift element, on the one hand, and the second shift element, on the other hand, are actuatable with the aid of the actuating element starting from a neutral position. This has the advantage that, due to this combination, the number of actuating elements can be reduced and, therefore, the manufacturing complexity can also be reduced.

Alternatively or even in addition to the aforementioned example variants, the third shift element and the fourth shift element are combined to form one shift element pair, with which one actuating element is associated. The third shift element, on the one hand, and the fourth shift element, on the other hand, is actuatable with the aid of this actuating element starting from a neutral position. As a result, the manufacturing complexity can be reduced, in that, due to the combination of the two shift elements to form one shift element pair, one actuating unit can be utilized for both shift elements.

It is particularly preferred, however, when both aforementioned shift element pairs are implemented, so that the four shift elements of the transmission are actuatable via two actuating elements. As a result, a particularly low manufacturing complexity can be achieved.

As one further example embodiment of the invention, the rotor of the electric machine is connected to the second input shaft via a third planetary gear set. With respect to the elements of the third planetary gear set, a first element is fixed and a second element is connected to the second input shaft, while a third element of the third planetary gear set is connected to the rotor of the electric machine. This has the advantage that the electric machine, due to the additional ratio via the third planetary gear set, can be designed as a high-speed electric machine having low torque. If necessary, this connection of the electric machine can also be combined with further gear stages.

Within the scope of the invention, the planetary gear sets can each be present as a negative or minus planetary gear set, provided it allows for a connection of the elements, wherein the first element of the respective planetary gear set is a sun gear, the second element of the respective planetary gear set is a planet carrier, and the third element of the respective planetary gear set is a ring gear. A minus planetary gear set is composed, in a known way, in principle, to a person skilled in the art, of the elements sun gear, planet carrier, and ring gear, wherein the planet carrier, rotatably mounted, guides at least one planet gear, although preferably multiple planet gears, which each individually intermesh with the sun gear as well as with the surrounding ring gear.

Alternatively thereto, one planetary gear set or even multiple planetary gear sets could also be present as a positive or plus planetary gear set, provided this is permitted by the connection of the respective elements, wherein the first element of the respective planetary gear set is then a sun gear, the second element of the respective planetary gear set is a ring gear, and the third element of the respective planetary gear set is a planet carrier. In a plus planetary gear set as well, the elements sun gear, ring gear, and planet carrier are present, wherein the latter guides at least one planet gear pair, in which the one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are then to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. Preferably, the first planetary gear set and the second planetary gear set are present as minus planetary gear sets, wherein an optionally present, third planetary gear set is also preferably designed as a minus planetary gear set.

Within the scope of the invention, a starting component can be installed upstream from the transmission, for example a hydrodynamic torque converter or a friction clutch. This starting component can then also be an integral part of the transmission and acts to implement a starting process, in that the starting component enables a slip speed between the prime mover, which is designed, in particular, as an internal combustion engine, and the first input shaft of the transmission. In this case, one of the shift elements of the transmission or the separating clutch, which may be present, can also be designed as such a starting component, in that the starting component is present as a frictional shift element. In addition, a free-wheel unit to the transmission housing or to another shaft can be arranged on each shaft of the transmission, in principle.

The transmission according to example aspects of the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the first input shaft of the transmission is either permanently coupled to a crankshaft of the internal combustion engine or to the rotor shaft of the electric machine in a rotationally fixed manner or is connectable thereto via an intermediate separating clutch or a starting component. A torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" in a rotationally fixed manner or "are connected to each other" mean a permanent coupling of these components, and therefore said components cannot rotate independently of each other. In that respect, no shift element is provided between these components, which can be elements of the planetary gear sets and/or even shafts and/or a rotationally fixed component of the transmission. Instead, the corresponding components are fixedly connected to each other.

However, if a shift element is provided between two components, these components are not permanently coupled to each other in a rotationally fixed manner. Instead, a rotationally fixed coupling is carried out only by actuating the intermediate shift element. In this case, an actuation of the shift element means, within the meaning of the invention, that the respective shift element is transferred into an engaged condition and consequently synchronizes the turning motions of the components coupled directly thereto. In the case of an embodiment of the respective shift element as a form-locking shift element, the components directly connected to each other in a rotationally fixed manner via the shift element rotate at the same rotational speed, while, in the case of a force-locking shift element, speed differences can exist between the components even after an actuation of said shift element. This intentional or even unintentional condition is nevertheless referred to, within the scope of the invention, as a rotationally fixed connection of the respective components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. Wherein:

FIG. 3 shows an exemplary shift pattern of the transmission of the motor vehicle drive trains from FIGS. 1 and 2;

FIG. 5 shows a representation, in table form, of different conditions of the motor vehicle drive train from FIG. 4;

FIG. 7 shows a representation, in table form, of different conditions of the motor vehicle drive train from FIG. 6.

DETAILED DESCRIPTION

Figure 1:
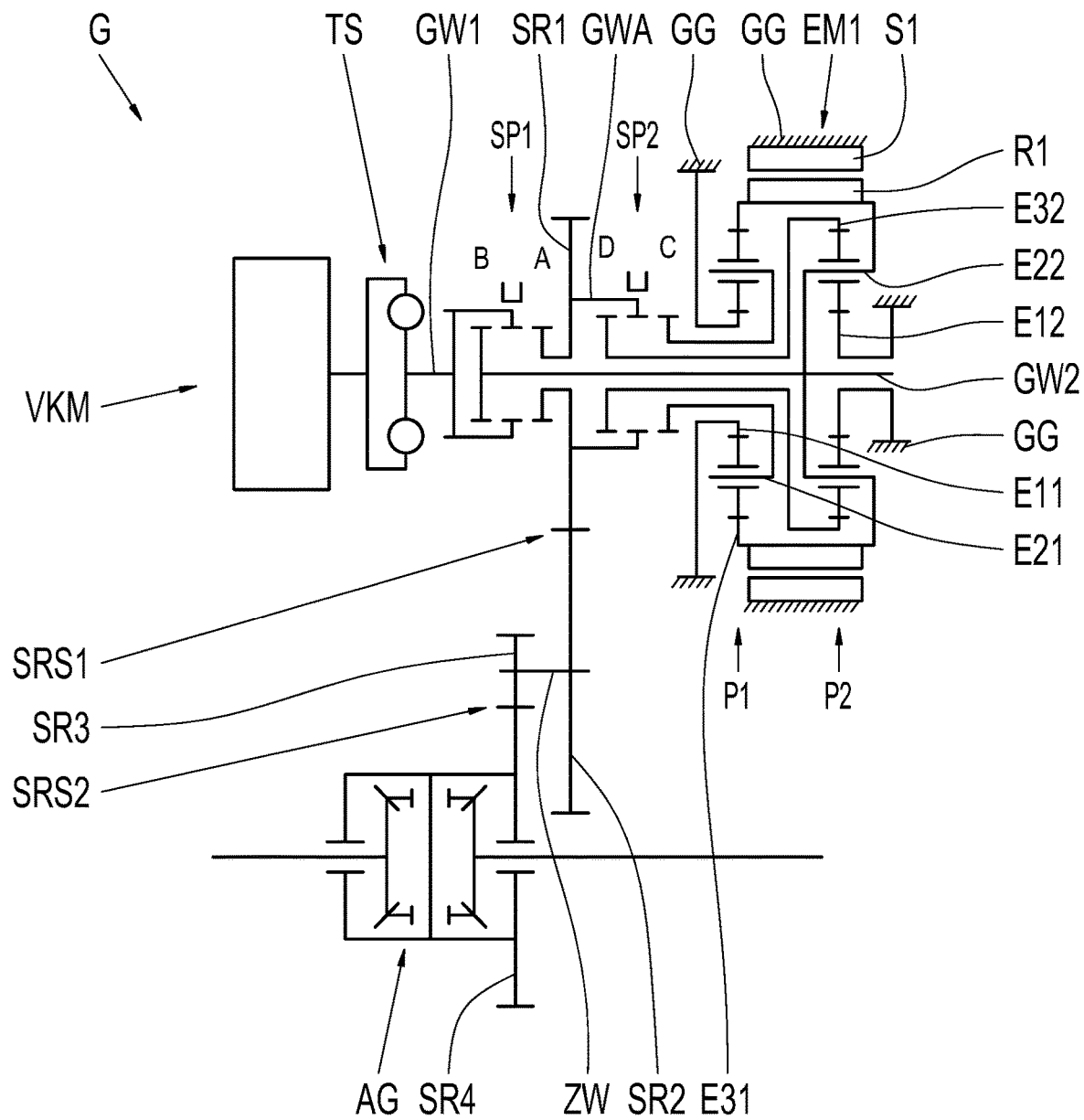
FIG. 1 shows a diagrammatic view of a motor vehicle drive train corresponding to a first example variant, including a transmission according to a first example embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels (not further represented here) on a drive axle of the motor vehicle. The transmission G and the torsional vibration damper TS are preferably arranged in a common housing of the transmission G, into which, more preferably, the differential gear AG is then also integrated. In the present case, in addition, the internal combustion engine VKM, the torsional vibration damper TS, the transmission G, and also the differential gear AG are aligned transversely to a direction of travel of the motor vehicle.

As is apparent in FIG. 1, the transmission G includes a first input shaft GW1, a second input shaft GW2, and an output shaft GWA, which are situated coaxially to one another. In addition, the transmission G includes two planetary gear sets P1 and P2, which are composed of a first element E11 and E12, respectively, a second element E21 and E22, respectively, and a third element E31 and E32, respectively, and are also arranged coaxially to the input shafts GW1 and GW2 and to the output shaft GWA. The first element E11 or E12 of the planetary gear set P1 or P2, respectively, is formed by a respective sun gear, while the second element E21 or E22 of the planetary gear set P1 or P2, respectively, is present as a planet carrier. Finally, the third element E31 or E32 of the planetary gear set P1 or P2, respectively, is formed by a respective ring gear of the planetary gear set P1 or P2, respectively.

In the present case, the two planetary gear sets P1 and P2 are minus planetary gear sets, in that the respective planet carrier, rotatably mounted, guides at least one planet gear, which is meshed with the respective radially internal sun gear as well as with the respective surrounding ring gear. Preferably, however, in the case of the first planetary gear set P1 as well as the second planetary gear set P2, multiple planet gears are guided with the aid of the respective planet carrier, which then individually intermesh with the respective sun gear as well as with the respective ring gear.

Provided a connection of the elements of the planetary gear sets P1 and P2 allows this, one or even both planetary gear sets P1 and P2 could also be designed as plus planetary gear sets, however. In this case, the respective second element E21 or E22 would then need to be formed by the respective ring gear, and the respective third element E31 or E32 would need to be formed by the planet carrier. The latter, rotatably mounted, would then guide at least one planet gear pair. One planet gear of the planet gear pair intermeshes with the respective, radially internal sun gear and one planet gear intermeshes with the respective, radially surrounding ring gear, wherein the planet gears of the at least one planet gear pair are also meshed with one another. Moreover, a particular stationary transmission ratio would need to be reduced by one.

As is apparent from FIG. 1, the first input shaft GW1 is rotationally fixed to an output side of the upstream torsional vibration damper TS and is rotationally fixable to the output shaft GWA via a first shift element A. In addition, the first input shaft GW1 is also shiftable into a rotationally fixed connection with the second input shaft GW2 by engaging a second shift element B. The second input shaft GW2 extends axially adjacent to the first input shaft GW1 as well as radially internally with respect to the output shaft GWA designed as a hollow shaft.

The second output shaft GW2 is rotationally fixed to a rotor R1 of an electric machine EM1 of the transmission G, wherein the electric machine EM1 is provided coaxially to the two planetary gear sets P1 and P2 and, axially, is located essentially at the level of the two planetary gear sets P1 and P2 as well as radially surrounding these. A stator S1 of the electric machine EM1 is fixed at a rotationally fixed component GG of the transmission G, which is, in particular, the housing of the transmission G or a portion of the housing. Moreover, the second output shaft GW2 is permanently connected in a rotationally fixed manner to the third element E31 of the first planetary gear set P1 and to the second element E22 of the second planetary gear set P2, so that the rotor R1 of the electric machine EM1 is also permanently rotationally fixed to these two elements E31 and E22.

Apart from the connectability, in a rotationally fixed manner, to the first input shaft GW1, the output shaft GWA is also rotationally fixable to the second element E21 of the first planetary gear set P1 by actuating a third shift element C and is rotationally fixable to the third element E32 of the second planetary gear set P2 with the aid of an engagement of a fourth shift element D. In addition, the output shaft GWA is coupled to the axle transmission AG, in that the output shaft GWA is rotationally fixed to a first spur gear SR1, which is part of a first spur gear stage SRS1 and is meshed with a second spur gear SR2 of this spur gear stage SRS1. The second spur gear SR2 is located, in a rotationally fixed manner, on an intermediate shaft ZW, which also guides, in a rotationally fixed manner, a first spur gear SR3 of a second spur gear stage SRS2. The first spur gear SR3 intermeshes with a second spur gear SR4 of the second spur gear stage SRS2, wherein the second spur gear SR4 is then rotationally fixed to a differential case of the axle transmission AG.

As is finally also apparent in FIG. 1, the first element E11 of the first planetary gear set P1 as well as the first element E12 of the second planetary gear set P2 are both fixed at the rotationally fixed component GG and, therefore, are both also permanently prevented from turning.

The shift elements A, B, C and D are each designed as form-locking shift elements in the present case and, specifically, are each present as dog clutches. The shift elements A, B, C and D are arranged axially between the first input shaft GW1 and the planetary gear sets P1 and P2, wherein the second shift element B is situated axially adjacent to the first input shaft GW1, followed axially by, initially, the first shift element A, then the fourth shift element D and, finally, the third shift element C.

The first shift element A and the second shift element B are located axially directly next to each other and are combined to form one shift element pair SP1, in that a common actuating element is associated with the first shift element A and the second shift element B, via which the first shift element A, on the one hand, and the second shift element B, on the other hand, are actuatable from a neutral position.

The third shift element C and the fourth shift element D also form a shift element pair SP2, in the case of which the third shift element C, on the one hand, and the fourth shift element D, on the other hand, are actuatable from a neutral position with the aid of a common actuating element.

Finally, the two planetary gear sets P1 and P2 are axially arranged, following the shift elements A, B, C and D, in the sequence first planetary gear set P1 and second planetary gear set P2. Therefore, the second planetary gear set P2 is located at an axial end of the transmission G positioned opposite the first input shaft GW1.

Figure 2:
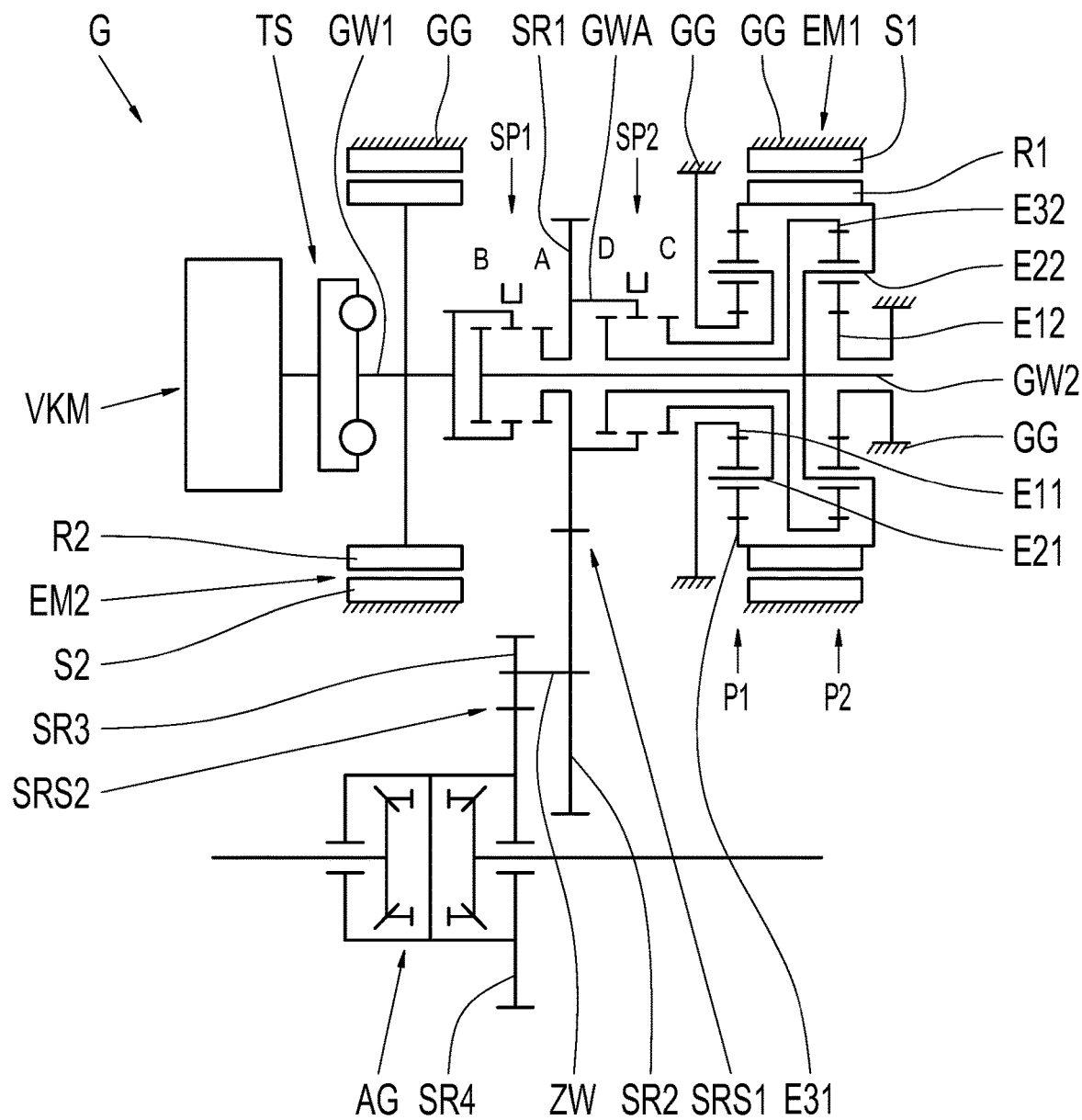
FIG. 2 shows a schematic of a motor vehicle drive train corresponding to a second example variant, including a transmission according to a second example design option of the invention.

FIG. 2 shows a diagrammatic view of a motor vehicle drive train according to a second example variant, wherein, in contrast to the example variant according to FIG. 1, a transmission G according to a second example design option of the invention is utilized in this case. This transmission G essentially corresponds to the example embodiment from FIG. 1, wherein, in contrast thereto, a rotor R2 of a further, coaxially arranged electric machine EM2 is permanently connected, in a rotationally fixed manner, to the first input shaft GW1 in this case. A stator S2 of this electric machine EM2 is permanently fixed at the rotationally fixed component GG. For the rest, the example variant according to FIG. 2 corresponds to the example embodiment according to FIG. 1, and therefore reference is made to the description thereof.

FIG. 3 shows an exemplary shift pattern for the transmission G of the motor vehicle drive trains from FIGS. 1 and 2 in table form. As is apparent, a total of three gears 1 through 3 are implementable between the first input shaft GW1 and the output shaft GW2 in this case, wherein, in the columns of the shift pattern, an x indicates which of the shift elements A, B, C and D is engaged in which of the gears 1 through 3. Two of the shift elements A, B, C and D are engaged in each of the gears 1 through 3. Moreover, a particular ratio i in the gears as well as a particular ratio step phi between the gears are also represented in further columns, wherein these apply for preferred stationary transmission ratios of the two planetary gear sets P1 and P2 of negative two and a half (−2.5) in each case.

As is apparent in FIG. 3, a first gear 1 is implemented between the first input shaft GW1 and the output shaft GWA by actuating the second shift element B and the third shift element C, wherein the first planetary gear set P1 contributes thereto. On the basis thereof, a second gear, which is effective between the first input shaft GW1 and the output shaft GWA, is formed in a first example variant 2a, in that the second shift element B is disengaged and the first shift element A is engaged. Since the first input shaft GW1 is rotationally fixed to the output shaft GWA when the first shift element A is engaged, a rigid direct drive onto the output shaft GWA takes place in this case, without one of the planetary gear sets P1 and P2 contributing thereto. In order to prepare for a gear shift into the third gear 3, which is effective between the first input shaft GW1 and the output shaft GWA, a changeover into a second example variant 2b of the second gear is carried out in advance, in that the third shift element C is disengaged and the fourth shift element D is engaged. Starting from this second example variant 2b, a shift into the third gear 3 is then carried out, in that the first shift element A is disengaged and, thereafter, the second shift element B is engaged. The ratio of the third gear 3 is generated via the second planetary gear set P2.

Although the shift elements A, B, C and D are each designed as form-locking shift elements, a shift between the first gear 1 and the first variant 2a of the second gear as well as between the second variant 2b of the second gear and the third gear 3 can be implemented under load. In the case of a gearchange between the first gear 1 and the first variant 2a of the second gear with the third shift element C engaged, the tractive force is supported via the electric machine EM1, while a synchronization of the first shift element A, which is to be engaged, is implemented with the aid of closed-loop control of the rotational speed of the internal combustion engine VKM. A changeover between the two variants 2a and 2b of the second gear takes place in the background as a preselection gear shift, wherein the tractive force is supported via the internal combustion engine VKM with the first shift element A engaged, while a synchronization of the fourth shift element D, which is to be engaged, takes place via closed-loop control of the rotational speed with the aid of the electric machine EM1. During a gearchange from the second variant 2b of the second gear into the third gear 3, the electric machine EM1 supports the tractive force with the fourth shift element D engaged, wherein the synchronization of the second shift element B, which is to be engaged, takes place with the aid of the closed-loop control of the rotational speed of the internal combustion engine VKM.

The transmissions G of the motor vehicle drive trains according to FIGS. 1 and 2 can also be operated in alternative operating modes with the aid of the electric machine EM1: purely electric driving can take place in a first gear E1, which is effective between the second input shaft GW2 and the output shaft GWA and, for the implementation of which, the third shift element C is to be transferred into an engaged condition. As a result, the rotor R1 of the electric machine EM1 is then coupled to the output shaft GWA via the first planetary gear set P1, wherein a ratio i of the first gear E1 corresponds to a ratio i of the first gear 1. Starting from the first gear E1, a start of the internal combustion engine VKM into the gears 1 and 2a can take place, since the third shift element C also contributes thereto. Therefore, a transition from purely electric driving into driving with the aid of the internal combustion engine or into hybrid driving can be carried out rapidly.

In addition, a second gear E3 can also be utilized for purely electric driving, which is also effective between the second input shaft GW2 and, therefore, the rotor R1 of the electric machine EM1 and the output shaft GWA. In order to shift the second gear E3, the fourth shift element D is to be engaged, so that the rotor R1 is then coupled to the output shaft GWA via the second planetary gear set P2. A ratio i of the second gear E3 corresponds to a ratio i of the third gear 3. In addition, starting from the second gear E3, a start of the internal combustion engine VKM into the second variant 2b of the second gear and into the third gear 3 can take place, since the fourth shift element D also contributes thereto.

Finally, a charging or start function can be implemented by engaging the second shift element B. This is the case because, in the engaged condition of the second shift element B, the first input shaft GW1 is directly coupled to the second input shaft GW2 and, therefore, also to the rotor R1 of the electric machine EM1, so that the internal combustion engine VKM is also coupled to the electric machine EM1 within the particular drive train. At the same time, there is no force-fit connection to the output shaft GWA, however, wherein the rotor R1 and the first input shaft GW1 run at the same rotational speed in this case. When the electric machine EM is operated as a generator, an electric accumulator can be charged via the internal combustion engine VKM, whereas, when the electric machine EM1 is operated as an electric motor, a start of the internal combustion engine VKM can be implemented via the electric machine EM1.

In the case of the motor vehicle drive train from FIG. 2, a start of the internal combustion engine VKM as well as a charging of an energy accumulator can also be carried out, however, with the aid of the further electric machine EM2, the rotor R2 of which is permanently coupled to the internal combustion engine VKM via the intermediate torsional vibration damper TS. In addition, the further electric machine EM2 can also support the internal combustion engine VKM during a synchronization of the shift elements A and B.

Figure 4:
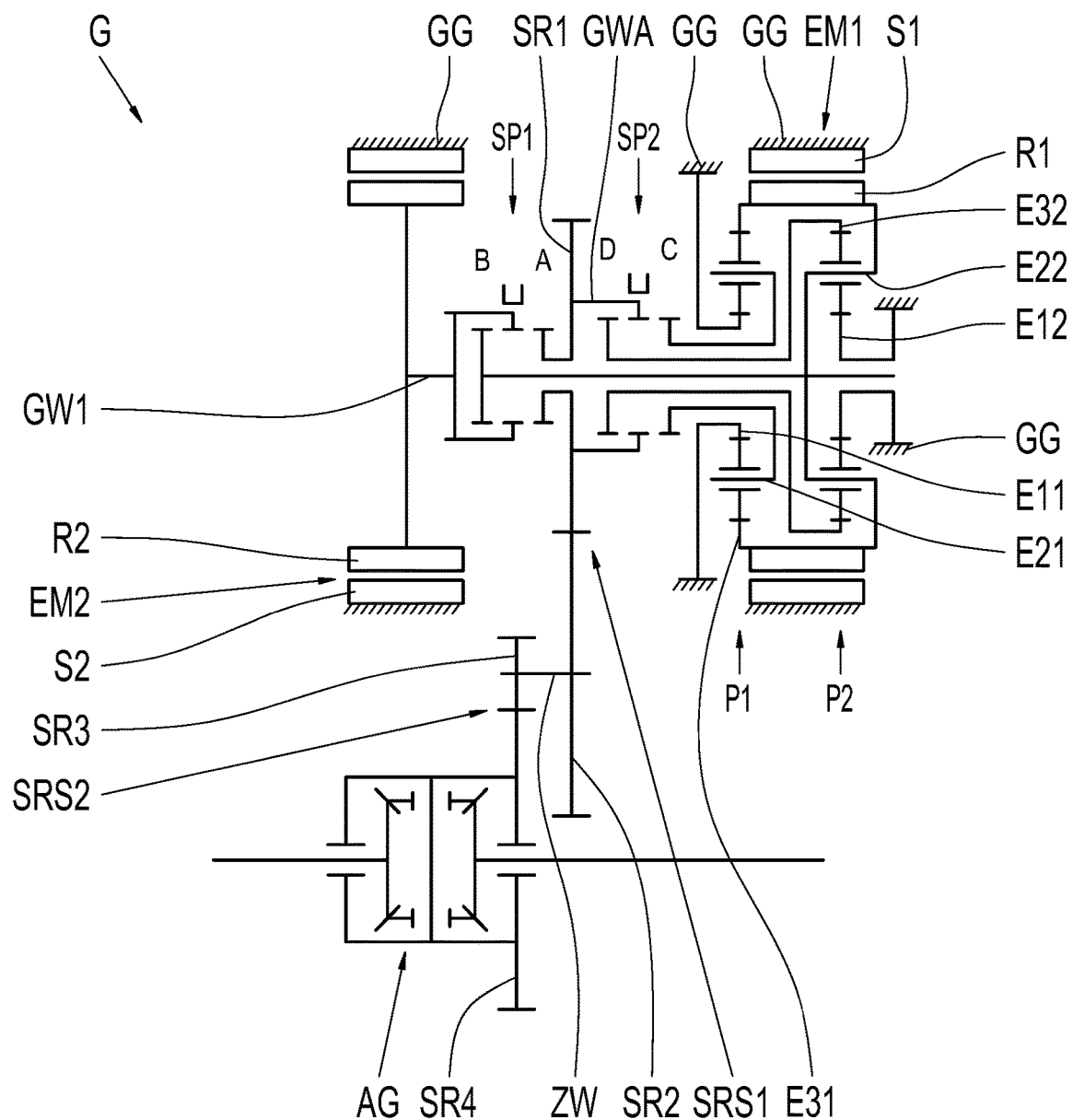
FIG. 4 shows a schematic of a motor vehicle drive train according to a third example variant, including a transmission according to the first example embodiment of the invention.

Moreover, FIG. 4 shows a schematic of a motor vehicle drive train corresponding to one further example variant, which largely corresponds to the example embodiment from FIG. 1. The only difference is that an internal combustion engine including a torsional vibration damper is not connected upstream from the transmission G in this case, but rather one further electric machine EM2 is connected upstream as the prime mover. In that respect, the motor vehicle drive train represented in FIG. 4 is designed for use in an electric vehicle. A rotor R2 of the electric machine EM2, which is arranged coaxially to the transmission G, is rotationally fixed to the first input shaft GW1 of the transmission G. Otherwise, the example embodiment according to FIG. 4 corresponds to the example variant according to FIG. 1, and therefore reference is made to the description thereof.

In FIG. 5, different conditions I through VII of the motor vehicle drive train from FIG. 4 are represented in table form, wherein these different conditions I through VII are achieved with the aid of different incorporations of the two electric machines EM1 and EM2. Overall, seven different conditions I through VII can be represented. In the subsequent columns, it is indicated which of the gears with respect to the electric machine EM1 and also with respect to the further electric machine EM2 are selected in the transmission G, wherein 0 means that no connection of the particular electric machine EM1 or EM2 to the output shaft GWA has been established.

In a first condition I, purely electric driving takes place with the aid of the electric machine EM1, in that, in the transmission G, the first gear E1 is selected in the way described above with respect to FIG. 3. Likewise, in the condition II, the motor vehicle drive train is operated solely with the aid of the electric machine EM1, wherein, in this case, the second gear E3 is selected in the transmission G, however, as also described above with respect to FIG. 3. In the condition III, however, driving takes place solely with the aid of the electric machine EM2, wherein, for this purpose, a second gear 2 is selected in the transmission G, which results from the sole actuation of the first shift element A. In this case, the rotor R2 of the further electric machine EM2 is directly connected to the output shaft GWA in a rotationally fixed manner. In the conditions I through III, driving can take place in a particularly effective manner, since, in the case of a low load request, driving takes place with the aid of only one of the two electric machines EM1 or EM2. The condition III is particularly effective in this case, since, in this case, the two planetary gear stages P1 and P2 as well as the electric machine EM1 are idle.

Starting at the condition IV, driving takes place with the aid of the electric machine EM1 as well as with the aid of the further electric machine EM2, in that both electric machines EM1 and EM2 are jointly incorporated via the selection of the appropriate gears in the transmission G. Thus, the first gear E1 and the first gear 1 are selected in the condition IV, the first gear E1 and the first variant 2a of the second gear are selected in the condition V, the second gear E3 and the second variant 2b of the second gear are selected in the condition VI, and the second gear E3 and the third gear 3 are selected in the condition VII. The representation of the individual gears is shown in the columns for the individual shift elements A, B, C and D and is specifically described with reference to FIG. 3.

Figure 6:
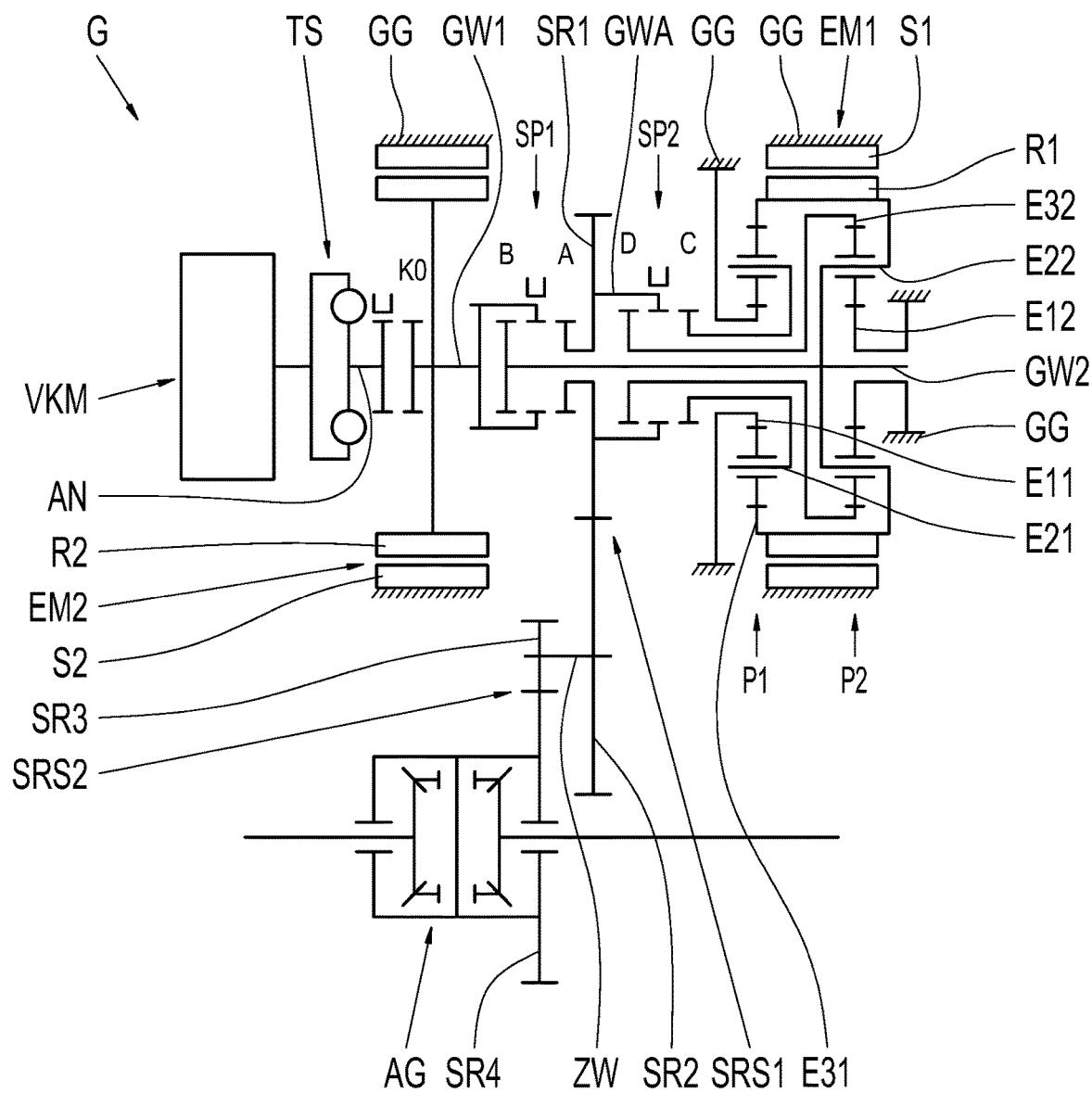
FIG. 6 shows a diagrammatic view of a motor vehicle drive train according to a fourth example variant, including a transmission corresponding to a third example design option of the invention.

FIG. 6 shows a diagrammatic view of a motor vehicle drive train according to one further example variant, wherein this variant forms a refinement of the example embodiment according to FIG. 2. The difference with respect to the example embodiment according to FIG. 2 is that the first input shaft GW1 is not permanently connected to the torsional vibration damper TS and, therefore, the internal combustion engine VKM as well, but rather is rotationally fixable via a fifth shift element K0 to a connection shaft AN, which is permanently connected to the torsional vibration damper TS and also to the internal combustion engine VKM. For the rest, the example variant according to FIG. 6 corresponds to the example embodiment according to FIG. 2, and therefore reference can be made to the description thereof.

FIG. 7 shows, in table form, different conditions I through XVI of the motor vehicle drive train from FIG. 6. It is apparent that, overall, sixteen different conditions I through XVI can be achieved, in that the internal combustion engine VKM and the two electric machines EM1 and EM2 are incorporated in different ways via an appropriate gear shift of the transmission G. In the columns following the columns of the conditions, the particular selected gear is indicated with respect to the electric machine EM1, with respect to the further electric machine EM2, and with respect to the internal combustion engine VKM. A 0 means that no connection to the output shaft GWA has been established with respect to the internal combustion engine VKM or the particular electric machine EM1 or EM2. The shift conditions of the shift elements A, B, C, D and K0 are indicated in the subsequent columns.

In the two conditions I and II, driving takes place solely with the aid of the electric machine EM1, while, in the condition III, an operation takes place solely with the aid of the further electric machine EM2. In the case of the conditions IV through VII, the motor vehicle drive train is operated by simultaneously operating the two electric machines EM1 and EM2. In that respect, the conditions I through VII correspond to that described with respect to FIG. 5.

In the conditions VIII and IX, the internal combustion engine VKM is connected to the further electric machine EM2 and to both electric machines EM1 and EM2, wherein a start of the internal combustion engine VKM and/or a charging of an energy accumulator is possible. In the two conditions X and XI, serial driving takes place, wherein, before the serial operation, a start of the internal combustion engine VKM is possible with the aid of the further electric machine EM2. The further electric machine EM2 can also synchronize the fifth shift element K0 prior thereto.

In the case of the conditions XII through XVI, hybrid driving takes place, wherein this takes place in the case of the condition XII via the combination of the internal combustion engine with the further electric machine EM2 and, in the further conditions XIII through XVI, via simultaneous operation of the internal combustion engine VKM and both electric machines EM1 and EM2.

FIGS. 8 through 21 show different example modifications of the transmission G of the motor vehicle drive trains from the FIGS. 1, 2, 4 and 6. The individual example modification can be utilized in any of the aforementioned example modifications. For the sake of simplicity, only the upper half of the area of the transmission G, which is rotationally symmetrical in this case, is represented in the example modifications shown in FIGS. 8 through 18.

Figure 8:
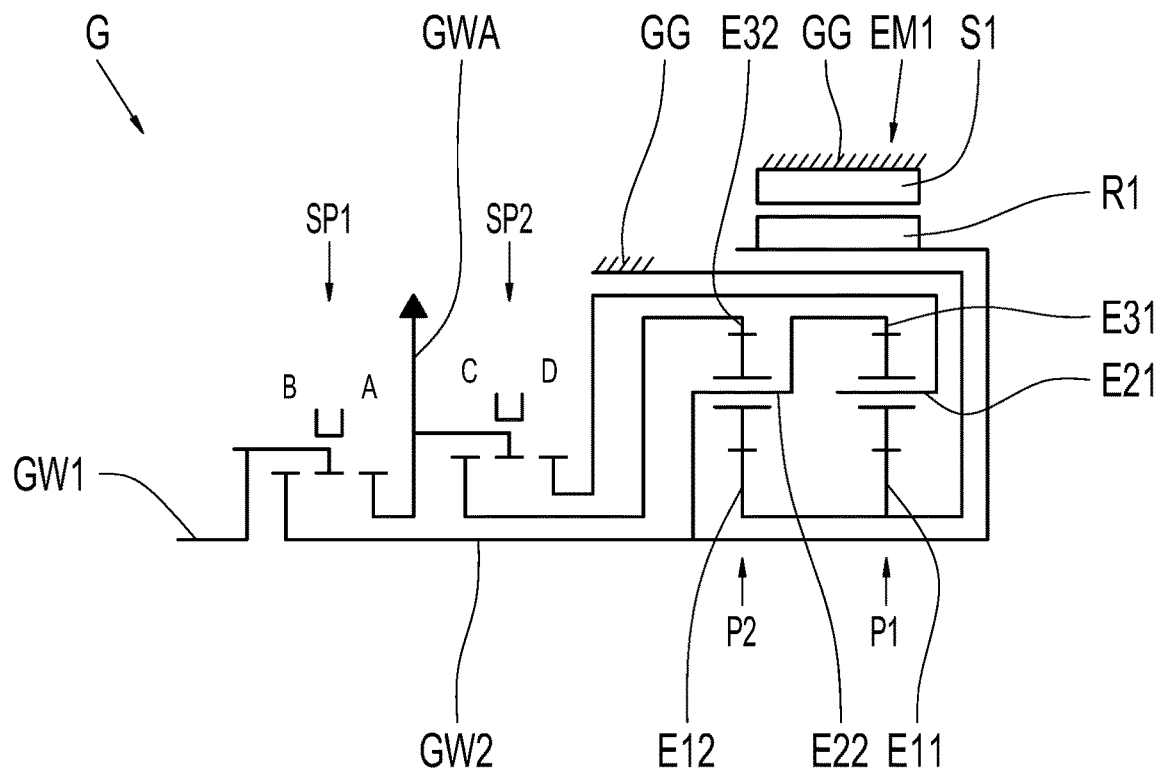
FIGS. 8 through 21 show different modifications of the transmission of the motor vehicle drive trains according to FIGS. 1, 2, 4, and 6.

FIG. 8 shows one example modification, in which, as compared to the example variants shown in FIGS. 1, 2, 4 and 6, the two planetary gear sets P1 and P2 have switched positions with respect to their axial arrangement, in that the second planetary gear set P2 is now situated axially between the first input shaft GW1 and the first planetary gear set P1. Moreover, the first element E11 of the first planetary gear set P1 and the first element E12 of the second planetary gear set P2 are connected to each other in a rotationally fixed manner and, jointly, are permanently fixed at the rotationally fixed component GG. Finally, the third shift element C and the fourth shift element D have switched the axial positions, wherein the two shift elements C and D are still combined to form one shift element pair SP2.

Figure 9:
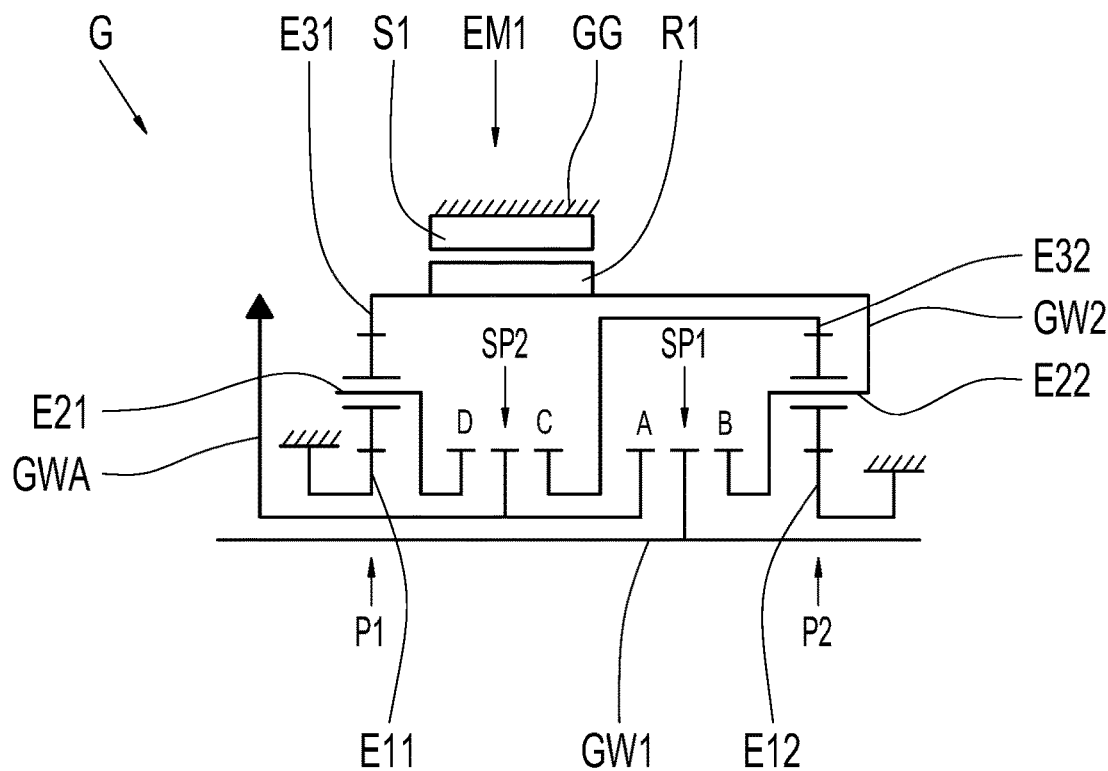

In the example modification from FIG. 9, in contrast to the example variants according to FIGS. 1, 2, 4 and 6, the shift elements A, B, C and D are arranged axially between the first planetary gear set P1 and the second planetary gear set P2. In this case, the fourth shift element D is provided axially adjacent to the first planetary gear set P1, wherein positioned axially subsequent thereto are, initially, the third shift element C, then the first shift element A and, finally, the second shift element B. In order to make this possible, the two planetary gear sets P1 and P2 are arranged spaced axially farther apart from one another, wherein, in addition, the first input shaft GW1 is extended axially into the area between the two planetary gear sets P1 and P2. Coinciding with the example variants according to FIGS. 1, 2, 4 and 6, the first shift element A and the second shift element B are combined to form one shift element pair SP1, and the third shift element C and the fourth shift element D are combined to form one shift element pair SP2. A supply of the shift element pair SP1 takes place via the first input shaft GW1, while the shift element pair SP2 is supplied via the output shaft GWA.

Figure 10:
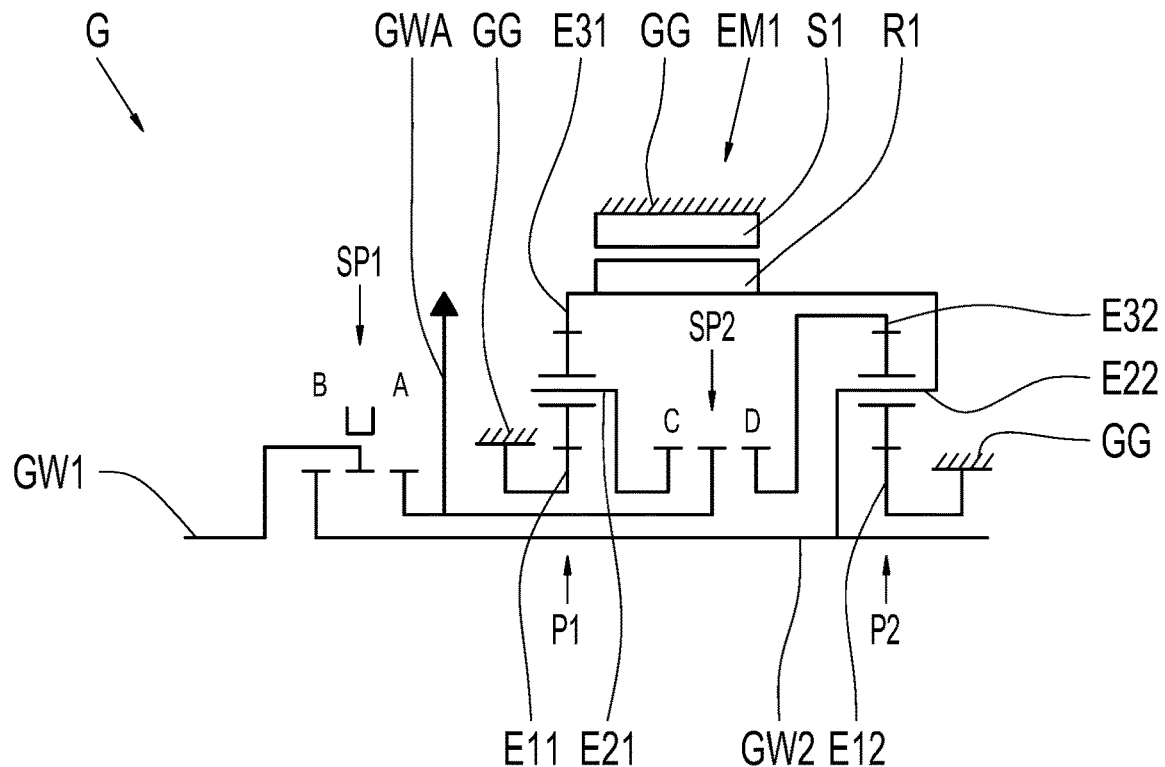

FIG. 10 shows one further example modification, in which, in contrast to the example variants according to FIGS. 1, 2, 4 and 6, the third shift element C and the fourth shift element D are arranged axially between the first planetary gear set P1 and the second planetary gear set P2. In addition, as compared to the example variants according to FIGS. 1, 2, 4 and 6, the two shift elements C and D have axially switched positions. A supply of the shift element pair SP2, which is a combination of the third shift element C and the fourth shift element D, takes place via the second input shaft GW2.

Figure 11:
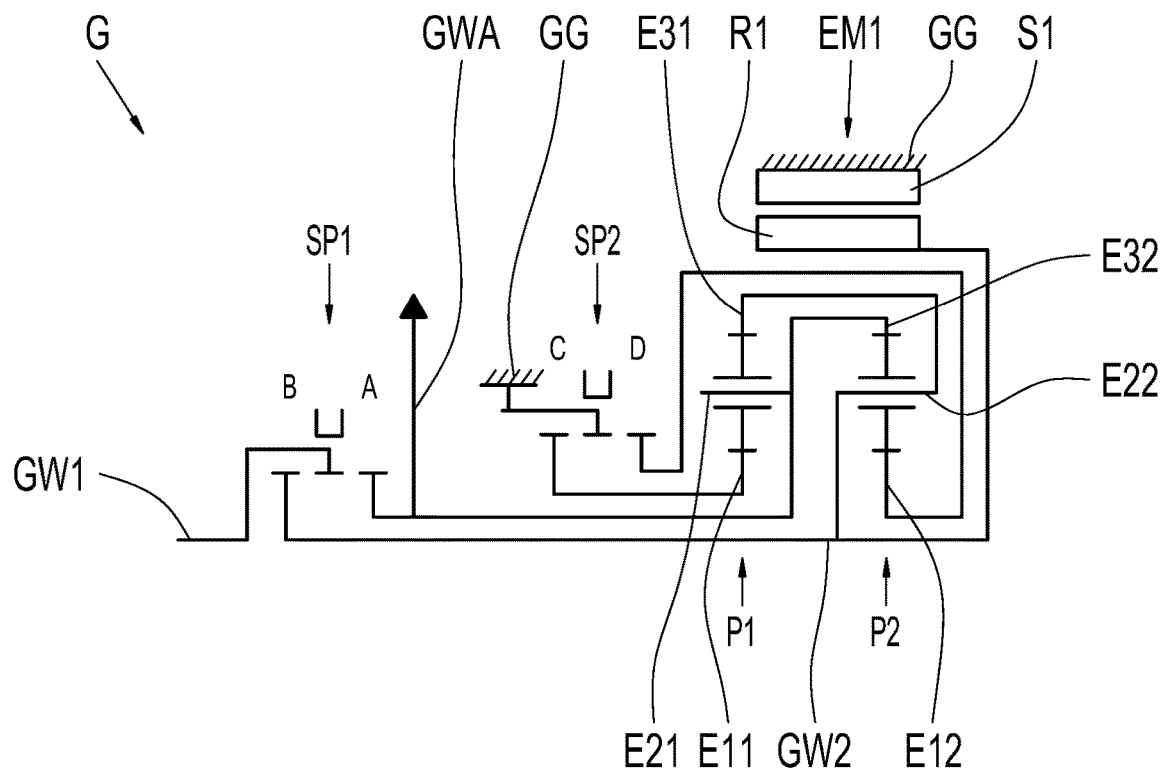

Moreover, FIG. 11 shows one further example modification of the type that can be utilized in the motor vehicle drive trains according to FIGS. 1, 2, 4 and 6. In contrast to that which is shown in FIGS. 1, 2, 4 and 6, the output shaft GWA is now permanently rotationally fixed to the second element E21 of the first planetary gear set P1 and to the third element E32 of the second planetary gear set P2. In addition, the first element E11 of the first planetary gear set P1 as well as the first element E12 of the second planetary gear set P2 are not permanently fixed at the rotationally fixed component GG. Instead, in the case of the first element E11 of the first planetary gear set P1, a fixation first takes place via actuation of a third shift element C and, in the case of the first element E12 of the second planetary gear set P2, a fixation first takes place via engagement of a fourth shift element D. The fourth shift element D is provided axially adjacent to the first planetary gear set P1, wherein the third shift element C is located axially adjacent thereto. The two shift elements C and D are combined to form one shift element pair SP2.

Figure 12:
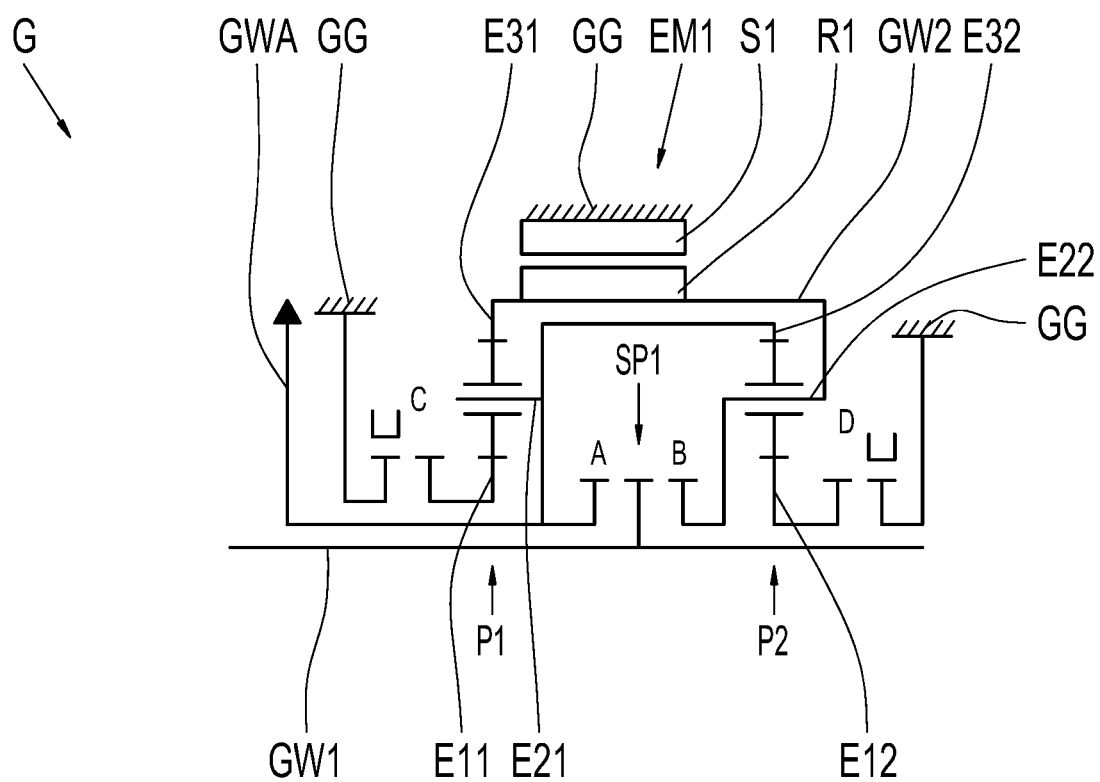

FIG. 12 shows an example modification that largely corresponds to the example variant of the preceding FIG. 11. In contrast thereto, however, the first shift element A and the second shift element B are now provided axially between the first planetary gear set P1 and the second planetary gear set P2, wherein the first shift element A is situated axially adjacent to the first planetary gear set P1. In addition, the third shift element C and the fourth shift element D are no longer combined to form a shift element pair, since the third shift element C is now provided axially on a side of the first planetary gear set P1 facing away from the second planetary gear set P2, while the fourth shift element D is located axially on a side of the second planetary gear set P2 facing away from the first planetary gear set P1. In order to make the arrangement of the two shift elements A and B possible, in addition, the first input shaft GW1 is extended axially into the area between the two planetary gear sets P1 and P2. For the rest, the example modification according to FIG. 12 corresponds to the example variant according to FIG. 11, and therefore reference is made to the description thereof.

Figure 13:
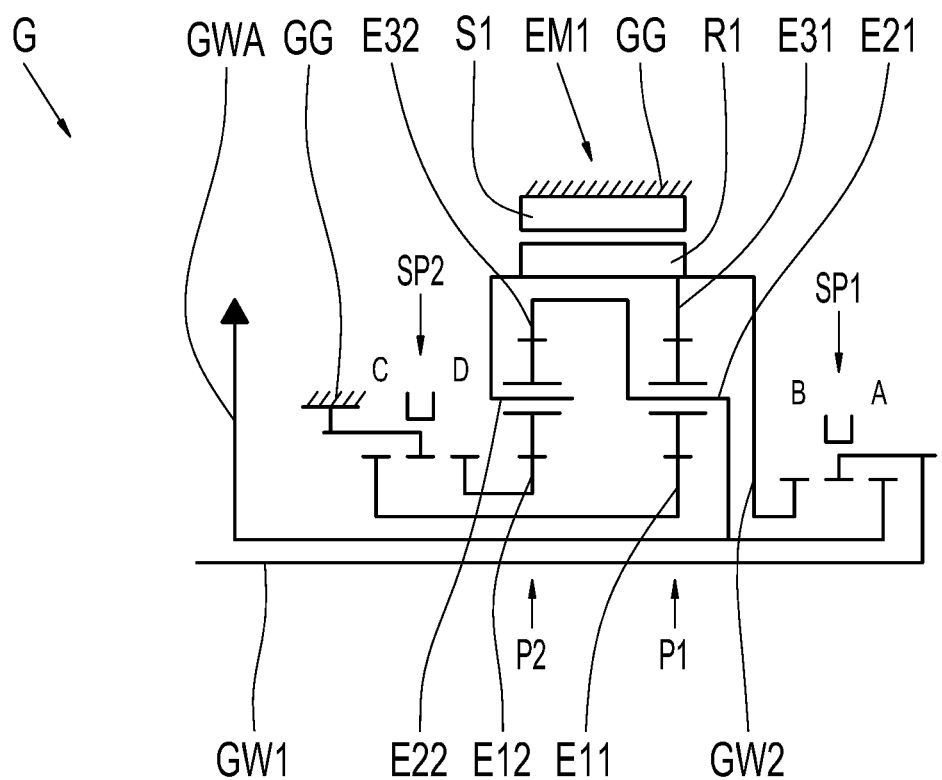

In addition, FIG. 13 shows a further example modification, which also essentially corresponds to the example variant from FIG. 11. One difference, however, is that the two planetary gear sets P1 and P2 now have axially switched positions, in that the second planetary gear set P2 is now provided axially initially, and is followed, axially, by the first planetary gear set P1. The first shift element A and the second shift element B are provided axially on a side of the first planetary gear set P1 facing away from the second planetary gear set P2, whereas the third shift element C and the fourth shift element D are located axially on a side of the second planetary gear set P2 facing away from the first planetary gear set P1. Otherwise, the example modification according to FIG. 13 corresponds to the example variant according to FIG. 11, and therefore reference is made to the description thereof.

Figure 14:
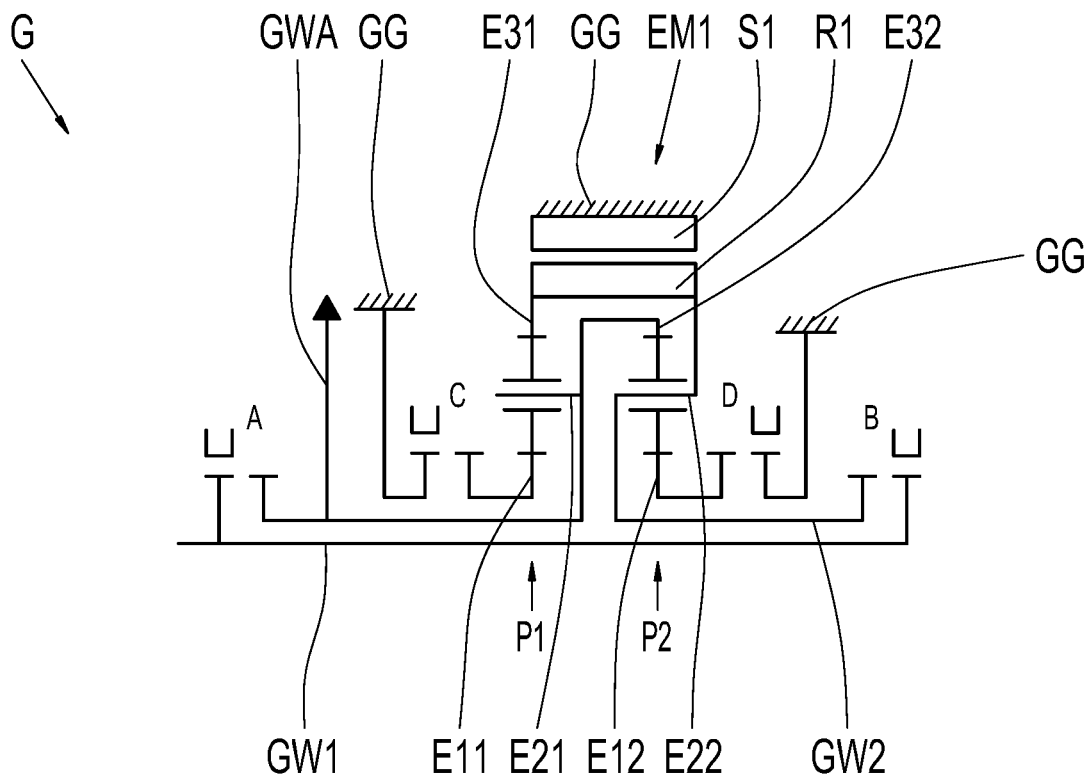

Moreover, FIG. 14 shows a further example modification, which also largely corresponds to the example variant according to FIG. 11. In contrast thereto, in this case, the shift elements A, B, C and D are each present as single shift elements, wherein the first shift element A and the third shift element C are provided axially on a side of the first planetary gear set P1 facing away from the second planetary gear set P2 and, specifically, the third shift element C is located axially adjacent to the first planetary gear set P1, followed by the first shift element A. However, the second shift element B and the fourth shift element D are provided axially on a side of the second planetary gear set P2 facing away from the first planetary gear set P1, wherein the fourth shift element D is located axially between the second planetary gear set P2 and the second shift element B. The first input shaft GW1 is extended axially through the second input shaft GW2, which is configured as a hollow shaft, and the output shaft GWA, which is also configured as a hollow shaft, into the area of the second shift element B. For the rest, the example variant according to FIG. 14 corresponds to the example modification according to FIG. 11, and therefore reference is made to the description thereof.

Figure 15:
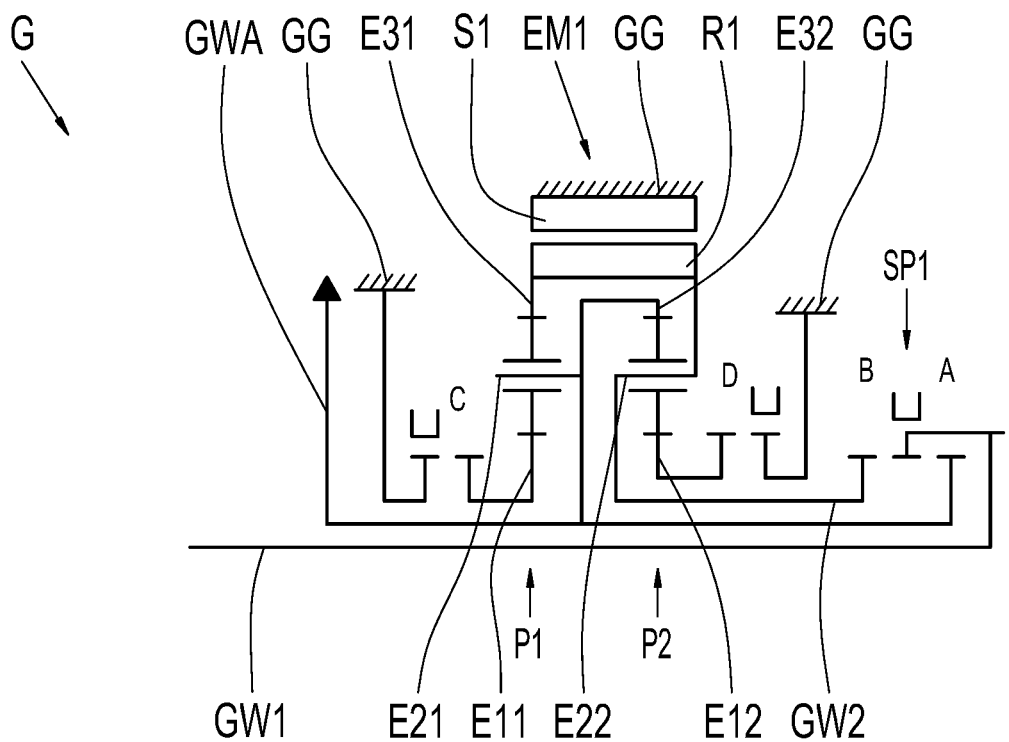

FIG. 15 shows a further example modification, wherein this example modification essentially corresponds to the preceding example variant according to FIG. 14. One difference, however, is that, in this case, the first shift element A is also provided axially on a side of the second planetary gear set P2 facing away from the first planetary gear set P1 and, together with the second shift element B, forms a shift element pair SP1. Consequently, the output shaft GWA is now also axially extended into this area, in order to be able to establish the rotationally fixed connection to the first input shaft GW1 via the first shift element A. For the rest, the example variant according to FIG. 15 corresponds to the example modification according to FIG. 14, and therefore reference is made to the description thereof.

Figure 16:
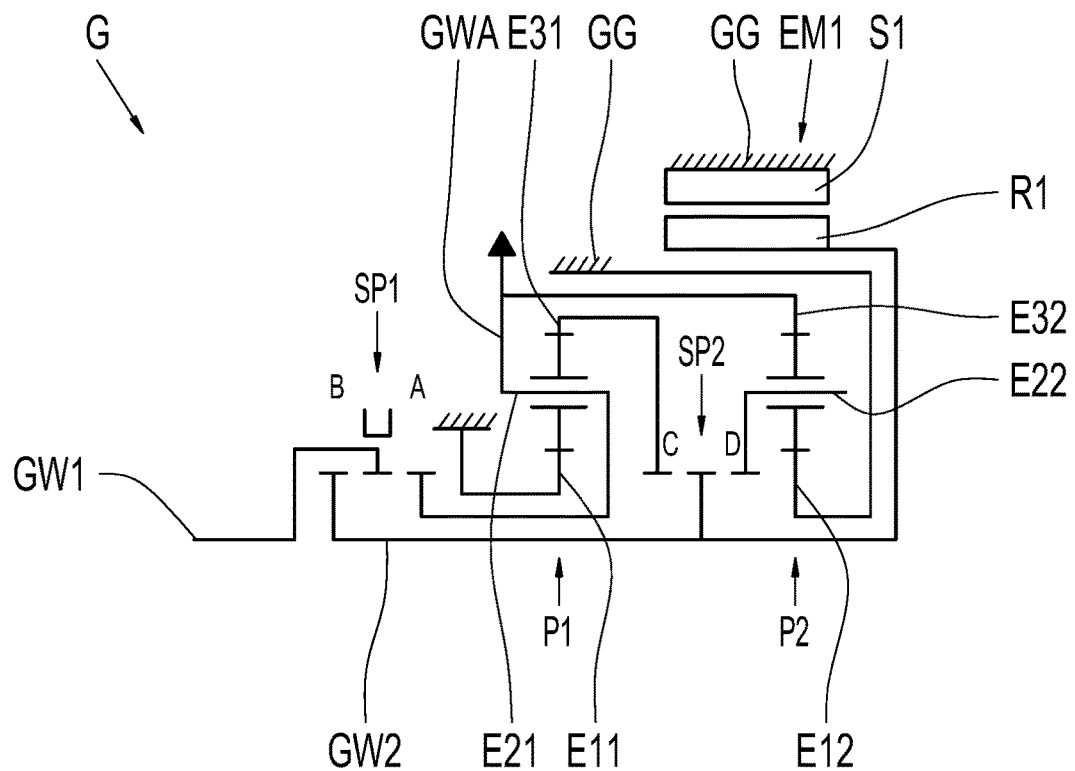

FIG. 16 shows a further example modification of the type that can be utilized in the transmissions G of the motor vehicle drive trains from FIGS. 1, 2, 4 and 6. In contrast to the example variants according to FIGS. 1, 2, 4 and 6, the second element E21 of the first planetary gear set P1 and also the third element E32 of the second planetary gear set P2 are permanently rotationally fixed to the output shaft GWA, while the second input shaft GW2 is only permanently rotationally fixed to the rotor R1 of the electric machine EM1. Moreover, the third element E31 of the first planetary gear set P1 is rotationally fixed to the second input shaft GW2 via actuation of a third shift element C, whereas an engagement of a fourth shift element D brings about a rotationally fixed connection of the second input shaft GW2 to the second element E22 of the second planetary gear set P2. The two shift elements C and D are combined to form one shift element pair SP2 and are located axially between the first planetary gear set P1 and the second planetary gear set P2. Specifically, the third shift element C is provided axially between the first planetary gear set P1 and the fourth shift element D. For the rest, the example modification according to FIG. 16 corresponds to the example embodiments according to FIGS. 1, 2, 4 and 6.

Figure 17:
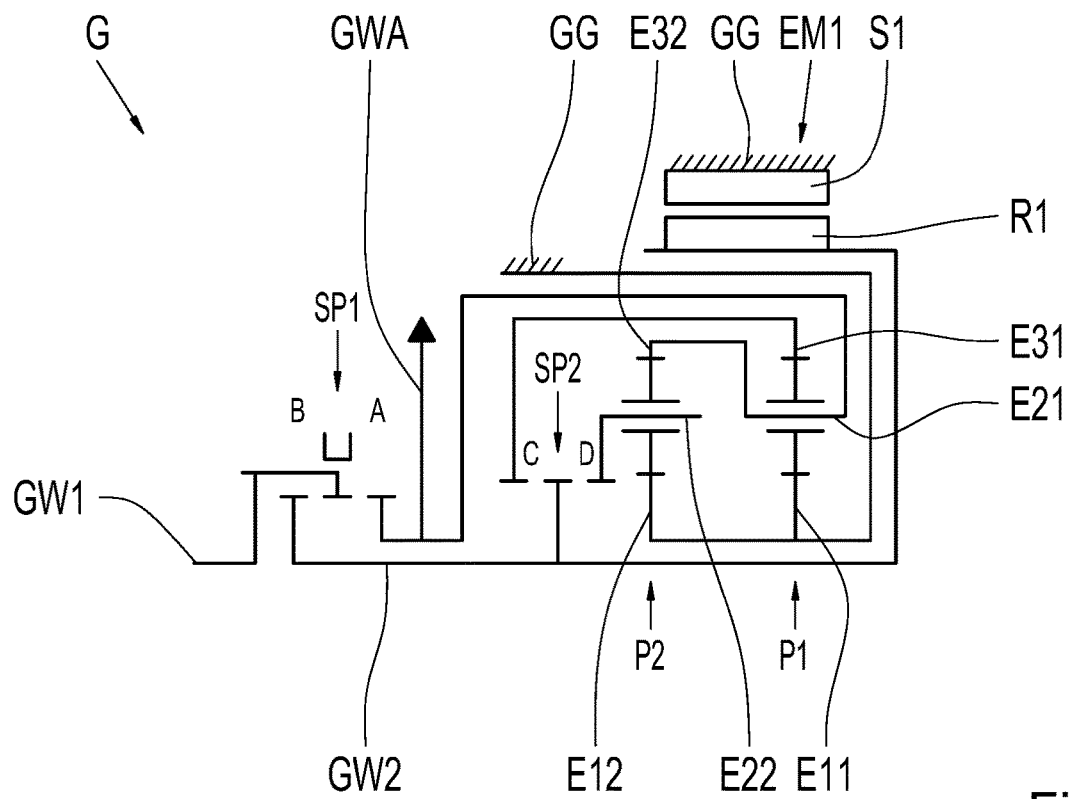

Moreover, FIG. 17 shows a further example modification, wherein this example modification largely corresponds to the preceding example variant according to FIG. 16. One difference, however, is that the first planetary gear set P1 and the second planetary gear set P2 are now arranged axially in another sequence, in that, in this case, the second planetary gear set P2 is provided axially between the first input shaft GW1 and the first planetary gear set P1. In addition, the third shift element C and the fourth shift element D are now provided axially on a side of the second planetary gear set P2 facing away from the first planetary gear set P1, wherein the fourth shift element D is provided axially between the third shift element C and the second planetary gear set P2. In addition, the first element E11 of the first planetary gear set P1 and the first element E12 of the second planetary gear set P2 are connected to each other in a rotationally fixed manner and, jointly, are permanently fixed at the rotationally fixed component GG. Otherwise, the example modification according to FIG. 17 corresponds to the example variant according to FIG. 16, and therefore reference is made to the description thereof.

Figure 18:
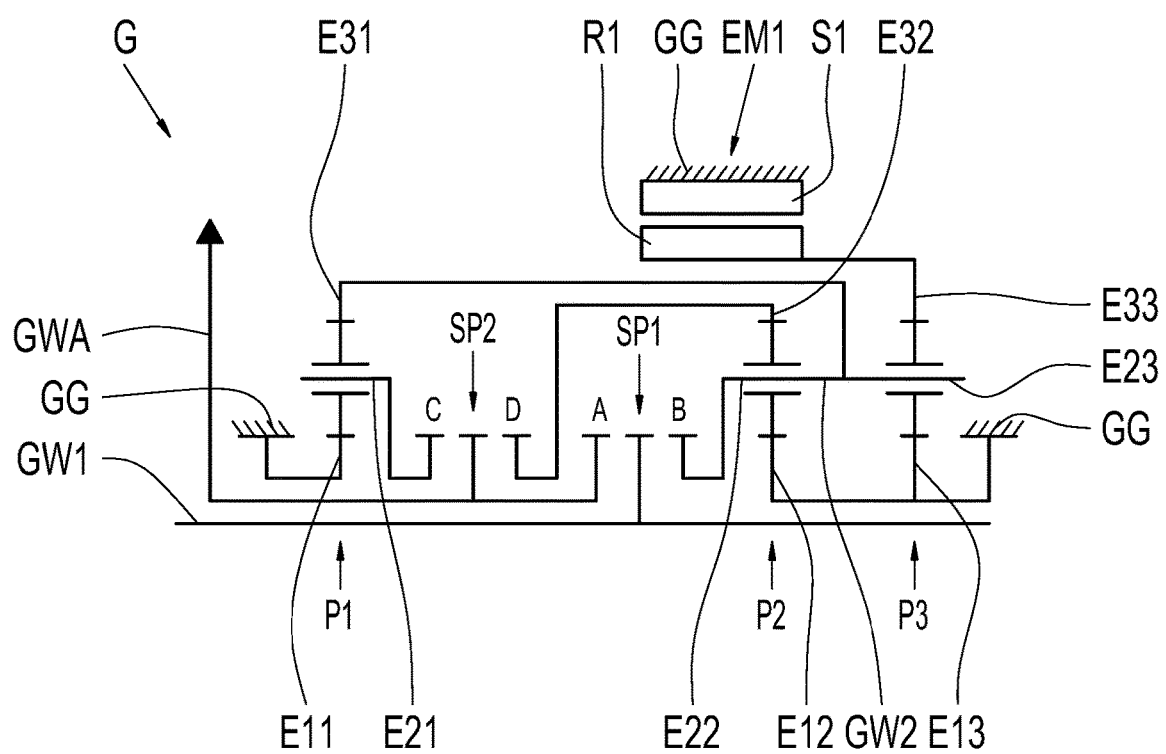

Moreover, FIG. 18 shows an example modification that is essentially modeled on the example variant from FIG. 9, although, in principle, it can be utilized in any other example modification. The difference with respect to the example variant according to FIG. 9 is that, in this case, the rotor R1 of the electric machine EM1 is not directly connected to the second input shaft GW2. Instead, a connection is established via an intermediate, third planetary gear set P3. The third planetary gear set P3 has a first element E13 in the form of a sun gear, a second element E23 in the form of a planet carrier, and a third element E33 in the form of a ring gear, wherein the planet carrier, rotatably mounted, guides at least one planet gear, which is meshed with the internal sun gear as well as with the surrounding ring gear.

While the first element E13 is permanently fixed at the rotationally fixed component GG, the second element E23 is rotationally fixed to the second input shaft GW2, and the third element E33 is rotationally fixed to the rotor R1 of the electric machine EM1. With the aid of the third planetary gear set P3, a turning motion of the rotor R1 is converted into a slower speed onto the second input shaft GW2, so that the electric machine EM 1 can be designed having lower torque and a high speed. A ratio could be one and a half (1.5) in this case.

Figure 19:
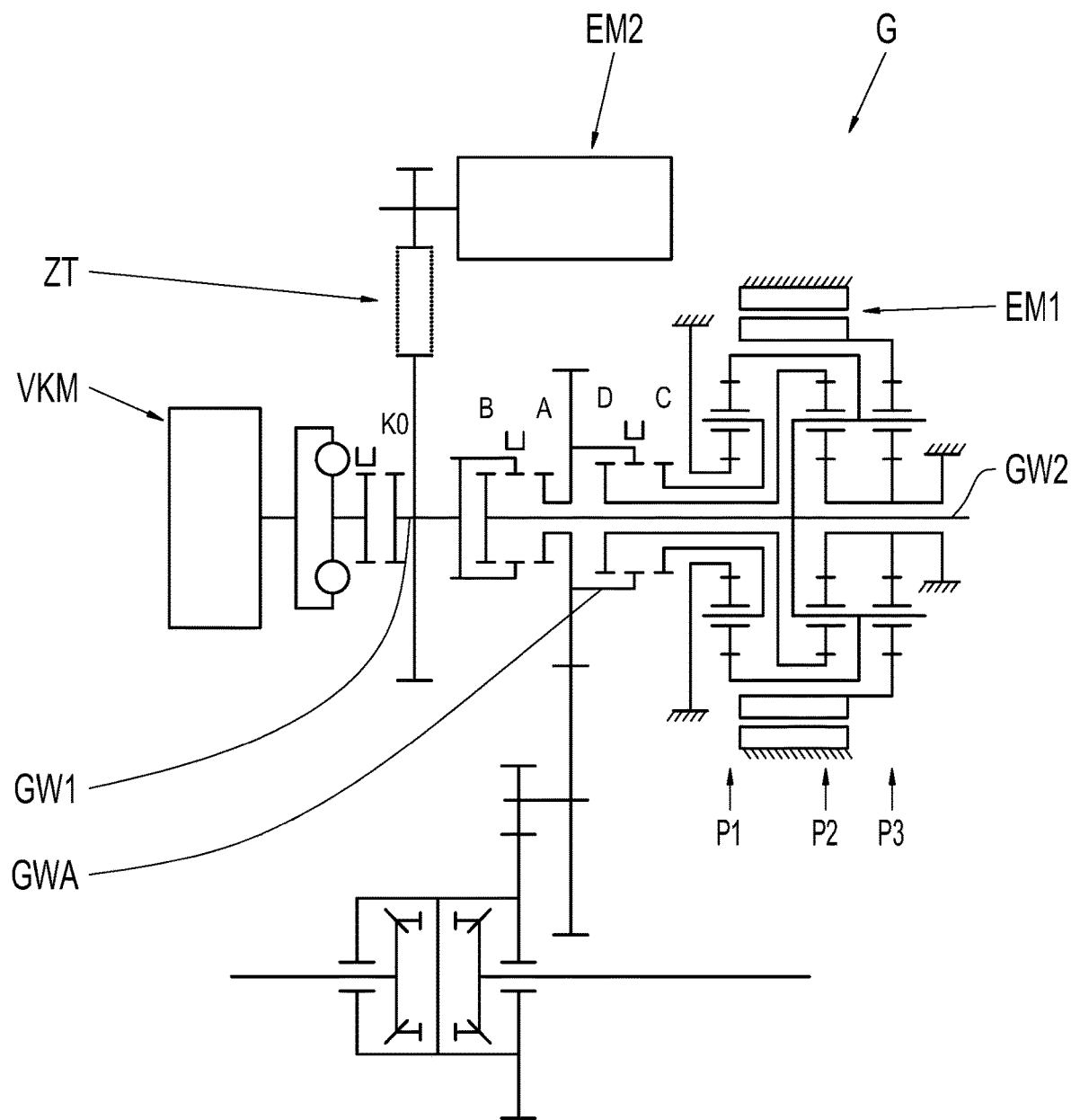
Figure 20:
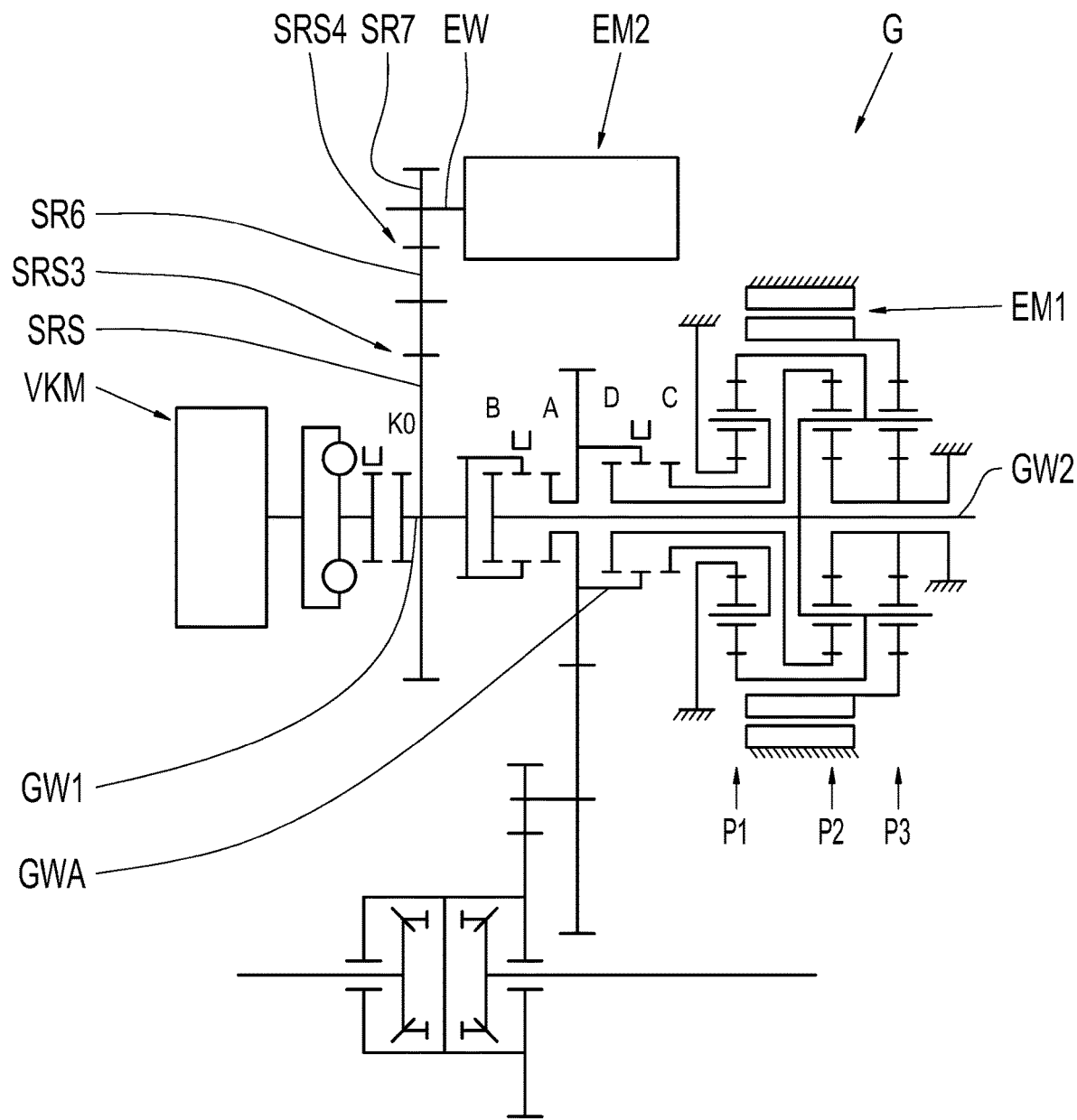
Figure 21:
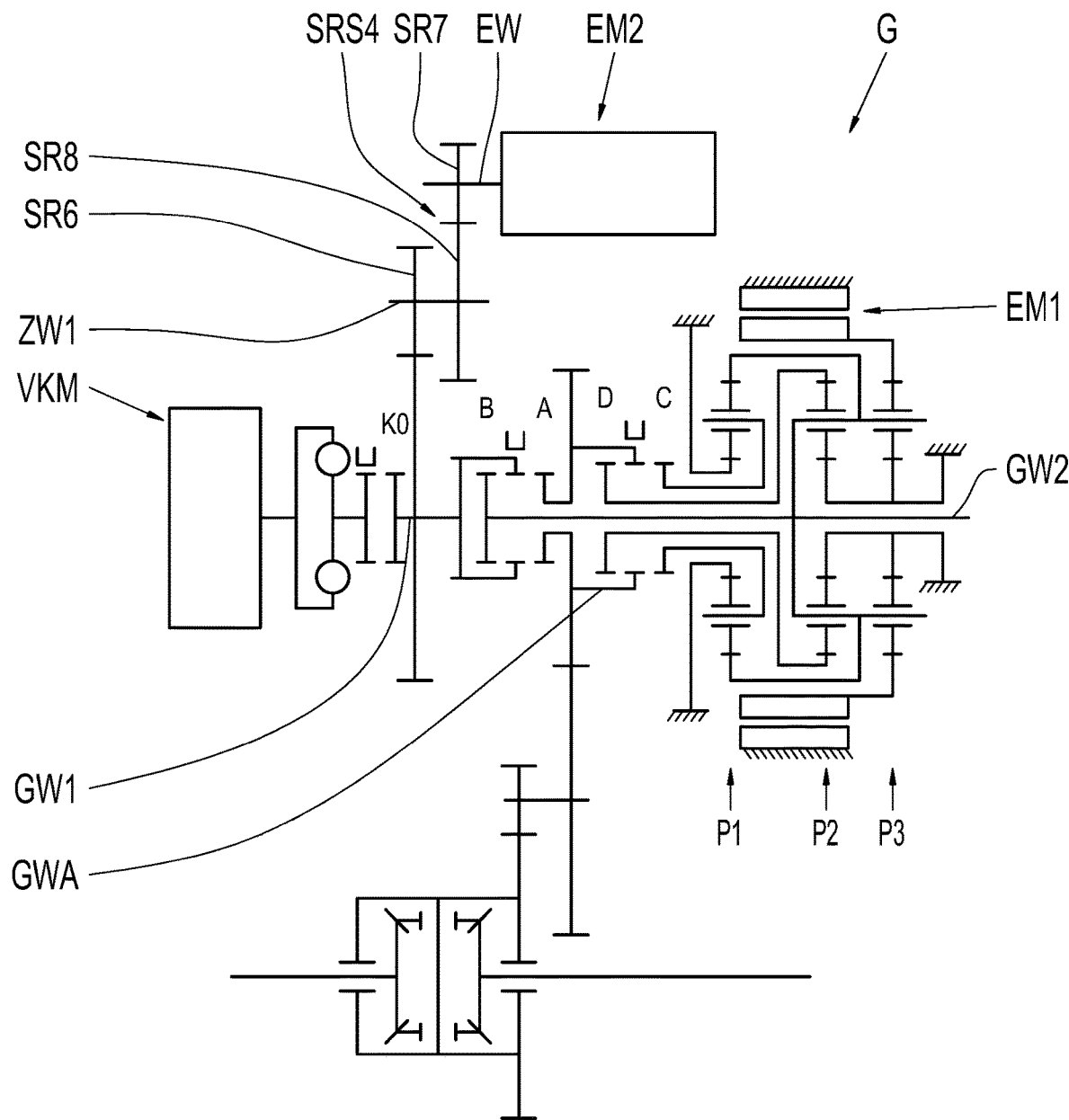

Finally, the example modifications of FIGS. 19 through 21 show example variants of the motor vehicle drive trains according to FIGS. 2, 4 and 6 including one further electric machine EM2. These are represented, in each case, for a motor vehicle drive train including an internal combustion engine VKM and two electric machines EM1 and EM2, although these can be utilized equally well in the motor vehicle drive train according to FIG. 4 including only two electric machines EM1 and EM2.

In the example modification according to FIG. 19, the further electric machine EM2 is not arranged coaxially, but rather is located so as to be axially offset, wherein a connection is implemented with the aid of a flexible traction drive mechanism ZT, which is, in particular, a chain drive. With respect to the two example modifications according to FIGS. 20 and 21 as well, the further electric machine EM2 is located so as to be axially offset, wherein the connection is achieved with the aid of two spur gear stages in this case, however.

Specifically, with respect to the modification according to FIG. 20, a spur gear SR5 is located on the first input shaft GW1 in a rotationally fixed manner and intermeshes with a spur gear SR6. The two spur gears SR5 and SR6 form a spur gear stage SRS3, wherein the spur gear SR6 is also part of a further spur gear stage SRS4, in that the spur gear SR6 is also meshed with a spur gear SR7. The spur gear SR7 is then provided on an input shaft EW of the further electric machine EM2 in a rotationally fixed manner.

In the case of the example variant according to FIG. 21 as well, the connection of the further electric machine EM2 is carried out in two stages, wherein, however, in contrast to the preceding example variant, the spur gear SR6 is provided on an intermediate shaft ZW1, which also supports a spur gear SR8 of a downstream spur gear stage SRS4. The spur gear SR8 then intermeshes with a spur gear SR7, which is located on an input shaft EW of the electric machine EM2.

With the aid of the embodiments according to the invention, a transmission can be created, with the aid of which different operating modes can be represented, and which has a compact design.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

G transmission
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
P3 third planetary gear set
E13 first element of the third planetary gear set
E23 second element of the third planetary gear set
E33 third element of the third planetary gear set
A first shift element
B second shift element
C third shift element
D fourth shift element
K0 fifth shift element
SP1 shift element pair
SP2 shift element pair
1 first gear
2a second gear
2b second gear
2 second gear
3 third gear
E1 first gear
E3 second gear
GW1 first input shaft
GW2 second input shaft
GWA output shaft
AN connection shaft
EM1 electric machine
S1 stator
R1 rotor
EM2 electric machine S2 stator
R2 rotor
EW input shaft
SRS1 spur gear stage
SRS2 spur gear stage
SRS3 spur gear stage
SRS4 spur gear stage
SR1 spur gear
SR2 spur gear
SR3 spur gear
SR4 spur gear
SR5 spur gear
SR6 spur gear
SR7 spur gear
SR8 spur gear
ZW intermediate shaft
ZW1 intermediate shaft
ZT flexible traction drive mechanism
VKM internal combustion engine
TS torsional vibration damper
AG differential gear
i ratio
phi ratio step
I through XVI conditions

The invention claimed is:

1. A transmission (G) for a motor vehicle, comprising:
an electric machine (EM1);
a first input shaft (GW1);
a second input shaft (GW2);
an output shaft (GWA);
a first planetary gear set (P1) and a second planetary gear set (P2), the first and second planetary gear sets (P1, P2) each including a respective plurality of elements (E11, E21, E31, E12, E22, E32); and
a first shift element (A), a second shift element (B), a third shift element (C), and a fourth shift element (D),
wherein a rotor (R1) of the electric machine (EM1) is connected to the second input shaft (GW2),
wherein the first input shaft (GW1) is connectable to the output shaft (GWA) in a rotationally fixed manner with the first shift element (A),
wherein the second input shaft (GW2) is connectable to the first input shaft (GW1) in a rotationally fixed manner with the second shift element (B),
wherein a first element (E11) of the first planetary gear set (P1) is coupled to a rotationally fixed component (GG) in a first coupling of the first planetary gear set (P1), a second element (E21) of the first planetary gear set (P1) is coupled to the output shaft (GWA) in a second coupling of the first planetary gear set (P1), a third element (E31) of the first planetary gear set (P1) is coupled to the second input shaft (GW2) in a third coupling of the first planetary gear set (P1), two couplings of the first planetary gear set (P1) are permanent rotationally fixed connections, and the remaining coupling of the first planetary gear set (P1) is a rotationally fixed connection establishable with the third shift element (C), and
wherein a first element (E12) of the second planetary gear set (P2) is coupled to the rotationally fixed component (GG) in a first coupling of the second planetary gear set (P2), a second element (E22) of the second planetary gear set (P1) is coupled to the second input shaft (GW2) in a second coupling of the second planetary gear set (P2), a third element (E32) of the second planetary gear set (P2) is coupled to the output shaft (GWA) in a third coupling of the second planetary gear set (P2), two couplings of the second planetary gear set (P2) are permanent rotationally fixed connections, and the remaining coupling of the second planetary gear set (P2) is a rotationally fixed connection establishable with the fourth shift element (D).

2. The transmission (G) of claim 1, wherein:
the first element (E11) of the first planetary gear set (P1) and the first element (E12) of the second planetary gear set (P2) are each fixed;
the third element (E31) of the first planetary gear set (P1) and the second element (E22) of the second planetary gear set (P2) are each rotationally fixed to the second input shaft (GW2); and
the output shaft (GWA) is rotationally fixable to the second element (E21) of the first planetary gear set (P1) with the third shift element (C) and is rotationally fixable to the third element (E32) of the second planetary gear set (P2) with the fourth shift element (D).

3. The transmission (G) of claim 1, wherein:
the third element (E31) of the first planetary gear set (P1) and the second element (E22) of the second planetary gear set (P2) are each rotationally fixed to the second input shaft (GW2);
the second element (E21) of the first planetary gear set (P1) and the third element (E32) of the second planetary gear set (P2) are each rotationally fixed to the output shaft (GWA); and
the first element (E11) of the first planetary gear set (P1) is fixable with the third shift element (C), and the first element (E12) of the second planetary gear set (P2) is fixable with the fourth shift element (D).

4. The transmission (G) of claim 1, wherein:
the first element (E11) of the first planetary gear set (P1) and the first element (E12) of the second planetary gear set (P2) are each fixed;
the second element (E21) of the first planetary gear set (P1) and the third element (E32) of the second planetary gear set (P2) are each rotationally fixed to the output shaft (GWA); and
the second input shaft (GW2) is rotationally fixable to the third element (E31) of the first planetary gear set (P1) with the third shift element (C), and the second input shaft (GW2) is rotationally fixed to the second element (E22) of the second planetary gear set (P2) with the fourth shift element (D).

5. The transmission (G) of claim 1, wherein exactly three gears between the first input shaft (GW1) and the output shaft (GWA) are shiftable by selectively engaging the first, second, third, and fourth shift elements (A, B, C, D).

6. The transmission (G) of claim 1, wherein, by selectively engaging the first, second, third, and fourth shift elements (A, B, C, D):
a first gear (1) results between the first input shaft (GW1) and the output shaft (GWA) by actuating the second shift element (B) and the third shift element (C);
a second gear results between the first input shaft (GW1) and the output shaft (GWA) by engaging the first shift element (A) and the third shift element (C) or by engaging the first shift element (A) and the fourth shift element (D); and
a third gear (3) results between the first input shaft (GW1) and the output shaft (GWA) by actuating the second shift element (B) and the fourth shift element (D).

7. The transmission (G) of claim 1, wherein a first gear (E1) results between the second input shaft (GW2) and the output shaft (GWA) by engaging the third shift element (C), and a second gear (E3) results between the second input shaft (GW2) and the output shaft (GWA) by actuating the fourth shift element (D).

8. The transmission (G) of claim 1, further comprising an additional electric machine (EM2), a rotor (R2) of additional electric machine (EM2) connected to the first input shaft (GW1).

9. The transmission (G) of claim 1, further comprising a fifth shift element (K0), the first input shaft (GW1) rotationally fixable to a connecting shaft (AN) with the fifth shift element (K0).

10. The transmission (G) of claim 1, wherein one or more of the first, second, third, and fourth shift elements (A, B, C, D) is a form-locking shift element.

11. The transmission (G) of claim 1, wherein the first shift element (A) and the second shift element (B) are combined as a shift element pair (SP1) with an actuating element, the first shift element (A) actuatable from a neutral position in one direction with the actuating element, and the second shift element (B) actuatable from the neutral position in an opposite direction with the actuating element.

12. The transmission (G) of claim 1, wherein the third shift element (C) and the fourth shift element (D) are combined to form a shift element pair (SP2) with an actuating element, the third shift element (C) actuatable from a neutral position in one direction with the actuating element, and the fourth shift element (D) actuatable from the neutral position in an opposite direction with the actuating element.

13. The transmission (G) of claim 1, further comprising a third planetary gear set (P3), the rotor (R1) of the electric machine (EM1) connected to the second input shaft (GW2) by the third planetary gear set (P3), a first element (E13) of the third planetary gear set (P3) is fixed, a second element (E23) of the third planetary gear set (P3) connected to the second input shaft (GW2), and a third element (E33) of the third planetary gear set (P3) connected to the rotor (R1) of the electric machine (EM1).

14. The transmission (G) of claim 1, wherein one or both of the first and second planetary gear sets (P1, P2) is a minus planetary gear set such that the respective first element (E11, E12, E13) of the one or both of the first and second planetary gear sets (P1, P2) is a sun gear, the respective second element (E21, E22, E23) of the one or both of the first and second planetary gear sets (P1, P2) is a planet carrier, and the respective third element (E31, E32, E33) of the one or both of the first and second planetary gear sets (P1, P2) is a ring gear.

15. The transmission (G) of claim 1, wherein one or both of the first and second planetary gear sets (P1, P2) is a minus planetary gear set such that the respective first element (E11, E12, E13) of the one or both of the first and second planetary gear sets (P1, P2) is a sun gear, the respective second element (E21, E22, E23) of the one or both of the first and second planetary gear sets (P1, P2) is a ring gear, and the respective third element (E31, E32, E33) of the one or both of the first and second planetary gear sets (P1, P2) is a planet carrier.

16. A motor vehicle drive train for a hybrid or electric vehicle, comprising the transmission (G) of claim 1.

17. A method for operating the transmission (G) of claim 1, wherein only the second shift element (B) is engaged to implement a charging operation or a starting operation.

* * * * *